US008068232B2

(12) United States Patent
Terrel et al.

(10) Patent No.: US 8,068,232 B2
(45) Date of Patent: Nov. 29, 2011

(54) UNIDIRECTIONAL CROW GYROSCOPE

(75) Inventors: Matthew A. Terrel, Stanford, CA (US); Michel J. F. Digonnet, Palo Alto, CA (US); Shanhui Fan, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 233 days.

(21) Appl. No.: 12/416,767

(22) Filed: Apr. 1, 2009

(65) Prior Publication Data

US 2009/0244544 A1    Oct. 1, 2009

Related U.S. Application Data

(60) Provisional application No. 61/041,567, filed on Apr. 1, 2008.

(51) Int. Cl.
*G01C 19/72* (2006.01)
(52) U.S. Cl. ...................................................... 356/461
(58) Field of Classification Search ........... 356/459–461
See application file for complete search history.

(56) References Cited

U.S. PATENT DOCUMENTS

| 4,273,445 | A | 6/1981 | Thompson et al. |
| 6,917,431 | B2 | 7/2005 | Soljacic et al. |
| 7,116,864 | B2 | 10/2006 | Yanik et al. |
| 7,385,177 | B2 | 6/2008 | Steinberg et al. |
| 7,911,622 | B2 | 3/2011 | Terrel et al. |
| 2009/0027754 | A1 | 1/2009 | Steinberg et al. |

FOREIGN PATENT DOCUMENTS

EP    1 391 693 A    2/2004

OTHER PUBLICATIONS

Slow Light Gyroscope based on coupled resonator waveguide structure, Nano-Optoelectronics Workshop, 2007. i-NOW '07. International.*
Arditty et al., *Sagnac effect in fiber gyroscopes*, Optics Letters, 1981, vol. 6, No. 8, pp. 401-403.

(Continued)

*Primary Examiner* — Tarifur Chowdhury
*Assistant Examiner* — Jonathon Cook
(74) *Attorney, Agent, or Firm* — Knobbe, Martens, Olson & Bear, LLP

(57) ABSTRACT

An optical waveguide gyroscope includes at least one optical coupler configured to receive a first optical signal at a first port, to transmit a second optical signal to a second port, and to transmit a third optical signal to a third port. The optical waveguide gyroscope further includes a plurality of resonant waveguides optically coupled to the second port and the third port. The resonant waveguides are generally adjacent to one another and optically coupled to one another. At least a portion of the second optical signal propagates from the second port to the third port by propagating through the plurality of resonant waveguides, and at least a portion of the third optical signal propagates from the third port to the second port by propagating through the plurality of resonant waveguides. The at least a portion of the second optical signal propagates through each resonant waveguide of the plurality of resonant waveguides in a clockwise direction and the at least a portion of the third optical signal propagates through each resonant waveguide of the plurality of resonant waveguides in a counterclockwise direction.

26 Claims, 21 Drawing Sheets

OTHER PUBLICATIONS

Dangui et al., *Phase Sensitivity to Temperature of the Fundamental Mode in Air-Guiding Photonic-Bandgap Fibers*, Optics Express, vol. 13, No. 18, 2005, pp. 6669-6684.

Deladi et al., *Carving fiber-top optomechnical transducers from an optical fiber*, Journal of Micromechanics and Microengineering, 2006, vol. 15, pp. 886-889.

Grudinin et al., "Ultrahigh optical Q factors of crystalline resonators in the linear regime," Phys. Rev. A 74, 063806 (2006).

Harris, Stephen, *Electromagentically Induced Transparency*, Physics Today, 1997, pp. 36-42.

Hocker, G.B., *Fiber-optic sensing of pressure and temperature*, Applied Optics, 1979, vol. 18, No. 9, pp. 1445-1459.

Hoo et al., *Evenescent-wave gas sensing using microstructure fiber*, Optical Engineering, 2002, 41(1) pp. 8-9.

International Search Report and Written Opinion for Application No. PCT/US2008/066986 dated Dec. 2, 2008.

Kersey et al., *Fiber Grating Sensors*, Journal of Lightwave Technology, 1997, vol. 15, No. 8, pp. 1442-1463.

Leeb et al., *Optical fiber gyroscopes: Sagnac or Fizeau effect?*, Applied Optics, 1979, vol. 18, No. 9, pp. 1293-1295.

Lefèvre, *The Fiber-Optic Gyroscope*, Ch. 11, Artech House, Boston (1993).

Lefèvre, *The Fiber-Optic Gyroscope*, Ch. 2, Artech House, Boston (1993).

Lefèvre, *The Fiber-Optic Gyroscope*, Ch. 3, Artech House, Boston (1993).

Lefèvre, *The Fiber-Optic Gyroscope*, Ch. 6, Artech House, Boston (1993).

Leonhart et al., *Ultrahigh Sensitivity of Slow-Light Gyroscope*, Physical Review A, 2000, vol. 62, 055801, pp. 1-2.

Lin et al., *Zero dispersion slow light with low leakage loss in defect Bragg fiber*, Applied Physics Letters, 2007, vol. 90, No. 3, 031109, pp. 1-3.

Matsko et al, "Erratum to Optical Gyroscope with whispering gallery mode optical cavities," Opt. Commun. 259, 393 (2006).

Matsko et al., "Optical gyroscope with whispering gallery mode optical cavities," Opt. Commun. 233, 107 (2004).

Parker et al., *A Fully Distributed Simultaneous Strain and Temperature Sensor using Spontaneous Brillouin Backscatter*, IEEE Photonics Tenchnology Letters, 1997, vol. 9, No. 7, pp. 979-981.

Pavlath, "Fiber optic gyros: the vision realized," in 18th International Optical Fiber Sensors Conference Technical Digest (Optical Society of America, Washington, DC, 2006), MA3.

Peng et al., "Optical gyroscope based on a coupled resonator with the alloptical analogous propertiy of electromagnetically induced transparency," Optics Express vol. 15, No. 7, 3864-3875, Apr. 2, 2007.

Peng et al., "Rotation sensing based on a slow-light resonating structure with high group dispersion," Applied Optics vol. 46, No. 19, 4125-4131, Jul. 2007.

Post E.J., *Sagnac Effect*, Reviews of Modern Physics, 1967, vol. 39, No. 2, pp. 475-493.

Purves G et al., *Sagnac Interferometry in a Slow-Light Medium*, Physical Review A 74, 023805, 2006, pp. 1-4.

Sandhu et al., *Dynamically tuned coupled-resonator delay lines can be nearly dispersion free*, Optics Letters, 2006, vol. 31, No. 13, pp. 1985-1987.

Scheuer et al., "Sagnac effect in coupled-resonator slow-light waveguide structures," Phys. Rev. Lett. vol. 96, 053901 (2006).

Shahriar M. S. et al., *Ultrahigh Enhancement in Absolute and Relative Rotation Sensing Using Fast and Slow Light*, Physical Review A 75, 053807, 2007, pp. 1-10.

Shi Z et al., *Enhancing The Spectral Sensitivity and Resolution of Interferometers Using Slow-Light Media*, Optics Society of America, CTuT2, 2006.

Shi Z et al., *Enhancing The Spectral Sensitivity of Interferometers Using Slow-Light Media*, Optics Letters, vol. 32, No. 8, 2007, pp. 913-917.

Soljacic M et al., *Photonic-Crystal Slow-Light Enhancement of Nonlinear Phase Sensitivity*, Journal of The Optical Society of America, 2002, vol. 19, No. 9, pp. 2052-2059.

Steinberg et al, "Rotation Induced Super Structure in Slow-Light Waveguides with Mode Degeneracy: Optical Gyroscopes with Exponential Sensitivity," JOSA B, vol. 25(5), 1216-1224, May 2007.

Terrell et al., "Performance Limitation of a Coupled Resonant Optical Waveguide Gyroscope," J. Lightwave Tech., vol. 27, No. 1, pp. 47-54 (2009).

Yanik et al., *Stopping and storing light coherently*, Physical Review A 71, 2005, 013803, pp. 1-10.

Yanik et al., *Stopping Light All Optically*, Physical Review Letters, 2004, vol. 92, No. 8, 183901, pp. 1-4.

Yanik et al., *Stopping Light in a Waveguide with an All-Optical Analog of Electromagnetically Induced Transparency*, Physical Review Letters, 2004, PRL 93, 233903, pp. 1-4.

Yariv et al., *Coupled-resonator optical waveguide: a proposal and analysis*, Optics Letters, 1999, vol. 24, No. 11, pp. 711-713.

Zimmer et al., *Sagnac Interferometry Based on Ultraslow Polaritons in Cold Atomic Vapors*, Physical Review Letters, 2004, vol. 92, No. 25., 253201, pp. 1-4.

Chow, J.H. et al., Phase-sensitive interrogation of fiber Bragg grating resonators for sensing applications, J. Lightwave Technol., May 2005, vol. 23, Issue 5, pp. 1881-1889.

Erdogan, T., Fiber grating spectra, J. of Lightwave Technology, 1997, vol. 15.

Examination Report dated Aug. 3, 2010, for European Application No. 08771079.4.

Gatti, D. et al., Fiber strain sensor based on a $\pi$-phase-shifted Bragg grating and the Pound-Drever-Hall technique, Optics Express, Feb. 4, 2008, vol. 16, Issue 3, pp. 1945-1950.

Johlen, D. et al., UV-induced absorption, scattering and transition losses in UV side-written fibers, Optical Fiber Communication Conference and the International Conference on Integrated Optics and Optical Fiber Communication, 1999 OSA Technical Digest Series (Optical Society of America, Washington, D.C.), paper ThD1, 1999, pp. 50-52.

Kersey, A.D. et al., High resolution fibre-grating based strain sensor with interferometric wavelength-shift detection, Electronic Letters, Jan. 1992, vol. 28, Issue 3.

Koo, K.P. et al., Bragg grating-based laser sensors systems with interferometric interrogation and wavelength division multiplexing, J. Lightwave Technol., Jul. 1995, vol. 13, Issue 7.

Lee, M. et al., Improved slow-light delay performance of a broadband stimulated Brillouin scattering system using fiber Bragg gratings, Applied Optics, Dec. 1, 2008, vol. 47, Issue 34, pp. 6404-6415.

Lemaire, P.J. et al., High pressure H2 loading as a technique for achieving ultrahigh UV photosensitivity and thermal sensitivity in GeO2 doped optical fibres, Electronic Letters, Jun. 1993, vol. 29, Issue 13.

Liu, Y. et al., Transmission loss of phase-shifted fiber Bragg gratings in lossy materials: a theoretical and experimental investigation, Applied Optics, 2007.

Misas, C.J. et al., Slowing of pulses to c/10 with subwatt power levels and low latency using brillouin amplification in a bismuth-oxide optical fiber, J. of Lightwave Technology, Jan. 2007, vol. 25, Issue 1.

Mok, Joe T., Dispersionless slow light using gap solitons, Nature Physics, Nov. 2006, vol. 21, pp. 775-780.

Ouellette, F. et al., Broadband and WDM dispersion compensation using chirped sample fibre Bragg gratings, Electronic Letters, May 1995, vol. 31, Issue 11.

Rao, Y.J., In-fibre Bragg grating sensors, Meas. Sci. Technol., 1997, vol. 8, pp. 355-375.

Shi, Z. et al., Enhancing the spectral sensitivity and resolution of interferometers using slow-light media, Quantum Electronics and Laser Science Conference, QELS '07, IEEE, PI, May 6, 2007, pp. 1-2 (presentation of 2006 Optical Society of America publication).

Yariv, et al., Optical Waves in Crystals: Electromagnetic Propagation in Periodic Media, pp. 155-215.

\* cited by examiner

UNIDIRECTIONAL CROW GYROSCOPE

CROSS-REFERENCE TO RELATED APPLICATIONS

This application claims the benefit of priority from U.S. Provisional Patent Appl. No. 61/041,567, filed on Apr. 1, 2008, and incorporated in its entirety by reference herein.

BACKGROUND OF THE INVENTION

1. Field of the Invention

This application relates generally to optical waveguide gyroscopes.

2. Description of the Related Art

Recent investigations have shown that slow light can have a profound impact on the optical properties of materials and systems. In particular, under certain conditions, the sensitivity of interferometric sensors can be in principle greatly enhanced by interrogating the interferometer with slow light. See, e.g., M. Soljacic, S. G. Johnson, S. Fan, M. Ibanescu, E. Ippen, and J. D. Joannopoulos, "Photonic-crystal slow-light enhancement of nonlinear phase sensitivity," *J. Opt. Soc. Am. B* Vol. 19, 2052-2059 (2002). This intriguing property has a number of physical origins, depending on the nature of the waveguide and of the perturbation applied to it. However, irrespective of the exact origin, the sensitivity of a number of different sensors has been shown to scale like the reciprocal of the group velocity. Since slow light can be characterized by an extremely large group index ($>10^5$), its use can in principle improve the sensitivity of optical sensors by many orders of magnitude. Although not all sensors benefit in terms of sensitivity from this slow-light enhancement, this prospect has far-reaching implications for many applications.

SUMMARY OF THE INVENTION

In certain embodiments, an optical waveguide gyroscope comprises at least one optical coupler having a first port, a second port, and a third port. The at least one optical coupler is configured to receive a first optical signal at the first port, to transmit a second optical signal to the second port, and to transmit a third optical signal to the third port. The optical waveguide gyroscope further comprises a plurality of resonant waveguides optically coupled to the second port and the third port. The resonant waveguides are generally adjacent to one another and optically coupled to one another. At least a portion of the second optical signal propagates from the second port to the third port by propagating through the plurality of resonant waveguides, and at least a portion of the third optical signal propagates from the third port to the second port by propagating through the plurality of resonant waveguides. The at least a portion of the second optical signal propagates through each resonant waveguide of the plurality of resonant waveguides in a clockwise direction and the at least a portion of the third optical signal propagates through each resonant waveguide of the plurality of resonant waveguides in a counterclockwise direction.

In certain embodiments, an optical waveguide gyroscope comprises a plurality of resonant waveguides generally adjacent to one another and optically coupled together. Each resonant waveguide of the plurality of resonant waveguides is configured to allow light to propagate through the resonant waveguide in a generally planar path. The paths of each of the resonant waveguides of the plurality of resonant waveguides are generally parallel to one another. Light propagates along each path in a clockwise direction or along each path in a counterclockwise direction.

For purposes of summarizing the invention, certain aspects, advantages and novel features of the invention have been described herein above. It is to be understood, however, that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION

A parameter that is of particular importance to detect with a high accuracy is rotation rate. Applications of rotation-sensing devices, or gyroscopes, cover a wide range, from inertial navigation of aircraft and automobiles to stabilization of sea oil platforms, guidance of missiles and rockets, etc. A number of optical gyroscope configurations based on coupled resonant optical waveguides (CROW) have been proposed and studied in the literature. See, e.g., J. Scheuer, and A. Yariv, "Sagnac effect in coupled-resonator slow-light waveguide structures," *Phys. Rev. Lett*, Vol. 96, 053901 (2006)); A. Yariv, Y. Xu, R. K. Lee, and A. Scherer, "Coupled-resonator optical waveguide: a proposal and analysis," *Opt. Lett*. Vol. 24, 711-713 (1999)); M. S. Shahriar et al, "Ultrahigh enhancement in absolute and relative rotation sensing using fast and slow light", Phys. Rev. A, Vol. 75, 053807 (2007); A. B. Matsko et al., "Optical gyroscope with whispering gallery mode optical cavities," Opt. Commun. 233, 107 (2004); Steinberg et al, "Rotation Induced Super Structure in Slow-Light Waveguides with Mode Degeneracy: Optical Gyroscopes with Exponential Sensitivity," JOSA B, Vol. 25(5), 1216-1224, May 2007; Chao Peng, Zhengbin Li, and Anshi Xu, "Rotation sensing based on a slow-light resonating structure with high group dispersion," Applied Optics Vol. 46, No. 19, 4125-4131, July 2007; and Chao Peng, Zhengbin Li, and Anshi Xu, "Optical gyroscope based on a coupled resonator with the all-optical analogous property of electromagnetically induced transparency," Optics Express Vol. 15, No. 7, 3864-3875, 2 Apr. 2007. These references claim that the disclosed gyroscopes have superior sensitivity, either relative to a single resonator structure (in essence a resonant fiber optic gyroscope (RFOG), see, e.g., H. Lefèvre, *The Fiber-Optic Gyroscope*, Ch. 11, Artech House, Boston (1993)), or relative to a conventional fiber optic gyroscope (FOG) (see, e.g., H. Lefèvre, *The Fiber-Optic Gyroscope*, Ch. 2, Artech House, Boston (1993)). Such claims are particularly noteworthy because first the fiber-optic gyroscope (FOG) has been for many years the most successful commercial fiber sensors (see, e.g., G. Pavlath, "Fiber optic gyros: the vision realized," in 18*th International Optical Fiber Sensors Conference Technical Digest* (Optical Society of America, Washington, D.C., 2006), MA3), and second because developing an optical gyroscope with a sensitivity greater than possible with a conventional FOG is an appealing prospect that would find several important applications. There is consequently a tremendous interest, both scientific and commercial, in developing a gyroscope with much greater sensitivity, and/or long-term stability, and/or scale factor stability, than the most successful commercial optical gyroscope to date, which is the FOG.

Figure 1A:
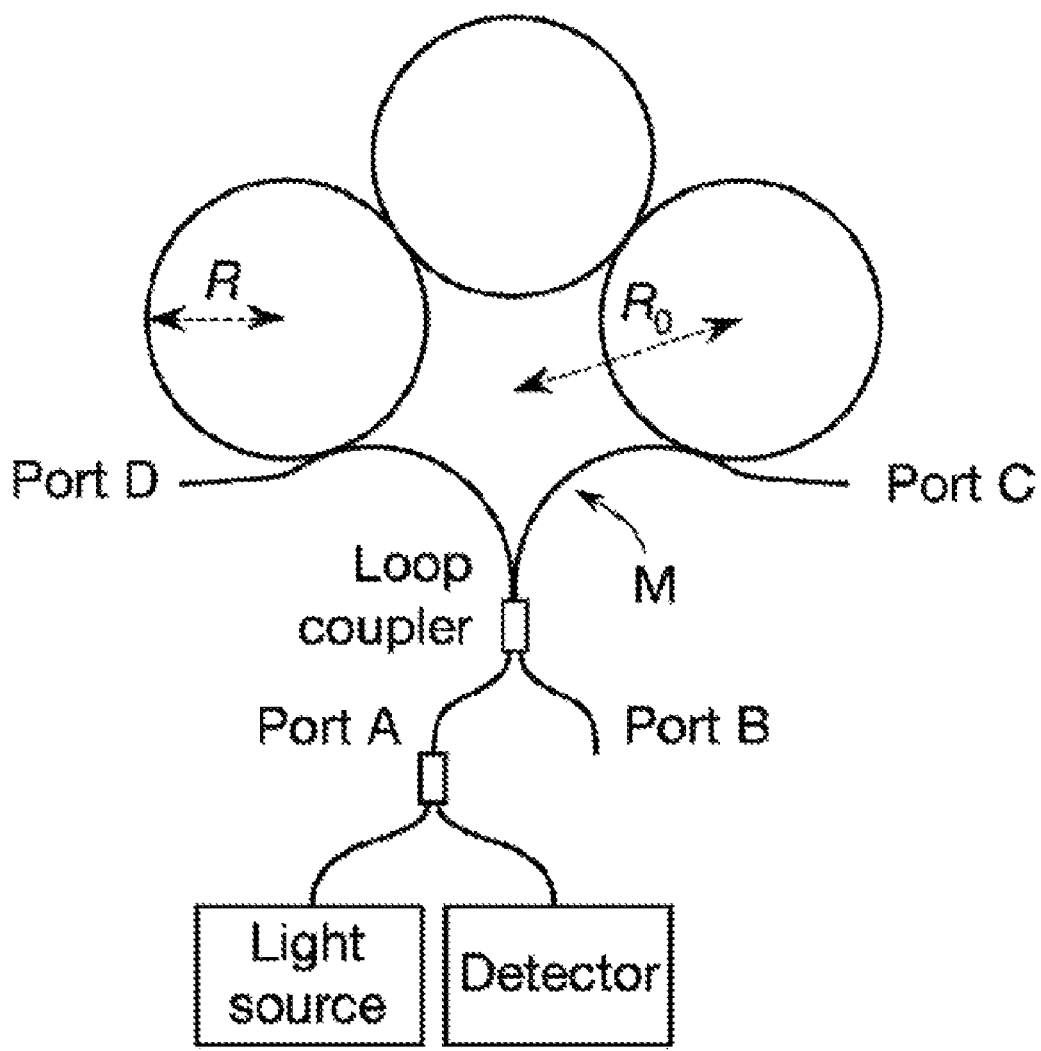
FIG. 1A schematically shows a diagram of an example conventional CROW gyroscope configuration with an odd-numbered series (N=3) of low-loss rings.
Figure 1B:
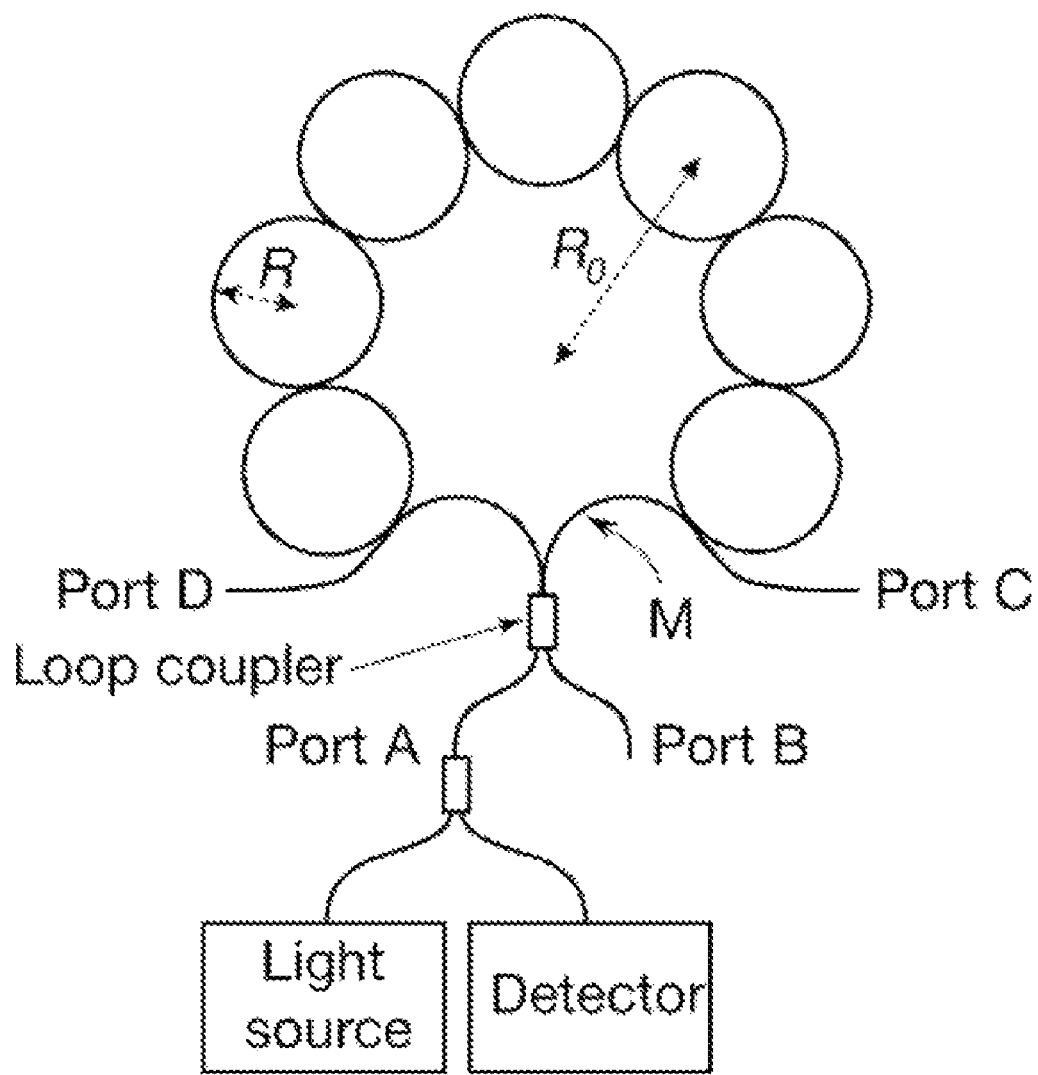
FIG. 1B schematically shows a diagram of an example conventional CROW gyroscope configuration with a series of seven rings.

FIGS. 1A and 1B schematically show two diagrams of conventional CROW gyroscopes of relevance. The CROW gyroscope of FIG. 1A has a loop comprising a series of N=3 low-loss resonators or resonant waveguides (e.g., rings), and the CROW gyroscope of FIG. 1B has a loop comprising a series of N=7 resonators or resonant waveguides (e.g., rings). The rings are optically coupled to each other with a power coupling ratio κ to form an open loop. This loop is closed with a 3-dB loop coupler to create a Sagnac interferometer. The loop coupler is optically coupled to a light source and a detector (e.g., via a second optical coupler as shown in FIGS. 1A and 1B). As in a conventional FOG, light is launched into the loop coupler, which splits it with equal power into two signals. One signal travels clockwise (cw) around the Sagnac loop, and the other one counterclockwise (ccw). For simplicity, the resonant waveguides can be assumed to be identical rings with the same radius R, and the power coupling coefficient between any two adjacent rings or between the rings and the leads can be assumed to be the same, and equal to κ. These conditions are not necessary for the proper operation of this Sagnac-based CROW gyroscope, or any of the other CROW gyroscopes discussed herein. The conclusions of the following analyses are qualitatively the same when the dimension and/or the coupling coefficient vary from ring to ring. The exact shape of the loop around which the N rings are arranged has also no bearing on the overall behavior of this sensor. For simplicity, it can be assumed throughout that the rings are all centered on a circle of radius $R_0$, and that the leads or injector couplers connecting the rings to the 3-dB coupler comprise circular arcs with the same radius of curvature as the rings (see FIGS. 1A and 1B).

To understand the operating principle of the CROW gyroscope, consider first the limit of strong coupling (κ=1). Each ring can support both cw and ccw modes. For example, the cw mode in ring j couples to the ccw mode in rings j+1 and j−1. The cw light signal then travels about half way through the first ring to an optical coupler (e.g., a portion of the first ring and the second ring which are strongly optically coupled to one another) at the far end of the first ring, where it is substantially fully coupled to the second ring. The same process takes place in each subsequent ring, until the signal reaches the 3-dB loop coupler. The light signal has therefore traveled around the loop in a "scalloped" pattern that encompasses a certain area B. The ccw signal undergoes the same process, except that it encounters the rings in the reverse order. So it follows the same optical path, but in the opposite direction. Hence as in a conventional FOG, in the absence of rotation and nonreciprocal effects, the two signals experience the same phase shift as they travel around the CROW loop in their respective directions. Consequently, when they recombine at the 3-dB coupler, they interfere constructively into the input arm of the coupler, and all the light (minus what is lost to losses within the loop) is detected at the detector (see FIGS. 1A and 1B). When the loop is rotated at a rate Ω about its main axis (i.e., perpendicular to its plane), as a result of the Sagnac effect light traveling in the direction of the rotation undergoes a stronger phase shift than light traveling in the opposite direction. The two signals are no longer in phase, which translates into a change in the power received by the detector. Except for the scalloped shape of the path followed by the light around the loop, this particular configuration behaves exactly the same way as a conventional FOG. In particular, it has the exact same sensitivity to rotation as a FOG encircling the same area B.

Figure 2:
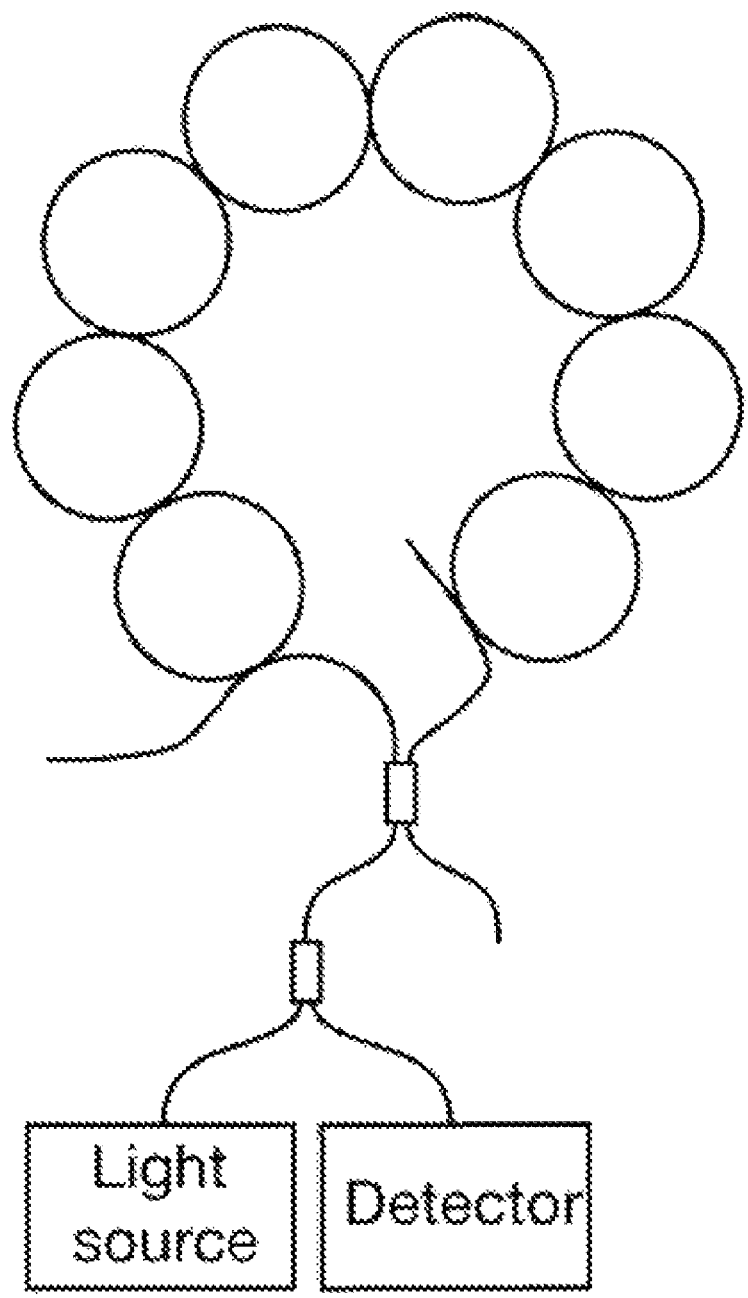
FIG. 2 shows a diagram of an example conventional CROW gyroscope configuration with an even-numbered series (N=8) of low-loss rings.

Note that, in FIGS. 1A and 1B, for the cw and ccw signals to return to the loop coupler instead of to port C and port D, respectively, which is undesirable, the number of rings is odd. By switching the ports of one of the two injection couplers, a similar configuration is created that supports only an even number of rings, as shown in FIG. 2. Both types of configurations have the same basic properties.

The CROW gyroscope starts differing from a FOG and becomes more interesting when κ<1, especially when κ is very weak. Each ring in the Sagnac loop is then a high-finesse resonator. The input laser signal frequency is selected to coincide with a resonance frequency of the (identical) rings at rest (zero rotation). For example, each ring can be considered to be a high Q cavity with low coupling to neighboring rings. At each junction or optical coupler between two neighboring rings, a very small fraction κ of the power passes on to the adjacent ring, while the rest of the power stays in the same ring. Thus, the effective group velocity of a signal propagating from ring to ring can be slow. When the gyroscope is at rest, each signal must thus travel multiple times around each ring, one ring after the other, before reaching the far end of the Sagnac loop and interfering with each other. When a rotation is applied to the Sagnac loop around an axis perpendicular to the plane of the loop, as a result of these multiple passes, each signal accumulates a larger rotation-induced (Sagnac) phase shift in each and every ring than if it were traveling through each ring only once, and the differential phase shift is enhanced. The applied rotation therefore results in a change in the optical power coming out of the Sagnac loop at port A (see FIGS. 1A and 1B), and this power change is larger than if the signals were not resonating around the rings. This enhancement is expected to scale like the number of times each signal travels around each ring, i.e., like 1/κ. For weak coupling (κ<<1), the increase in sensitivity can therefore be quite significant, as is the case in a resonant fiber optic gyroscope (RFOC) (see, e.g., H. Lefèvre, *The Fiber-Optic Gyroscope*, Ch. 11, Artech House, Boston (1993)).

For the CROW gyroscope to work optimally in certain embodiments, (1) all the rings have a common resonance frequency at all time, (2) the frequency of the interrogating light remains tuned to this common resonance frequency at rest, and (3) the linewidth of the light signal is substantially narrower than the linewidth of the resonant modes of each resonant waveguide. Achieving these conditions is done using very tight control of the optical path length, index, and transverse dimensions of all N rings simultaneously. All of these quantities vary when portions or all of the rings are subjected to a temperature change, stresses, and/or vibrations. Therefore, controlling these quantities constitutes a significant engineering challenge in practice. However, such challenges can be in principle met with existing technology. The very small size of some of the CROW gyroscopes considered for rotation-rate detection (rings of only tens of microns in diameter) helps reduce the temperature variations along the rings, and it reduces the thermal mass of the interferometer, two conditions that make it easier to control the temperature of the final structure. Nevertheless, because these structures involve multiple resonant waveguides to be stabilized to the same resonant frequency to an extraordinarily high precision, this stabilization process remains a serious engineering difficulty. Certain embodiments described more fully below advantageously satisfy the desired goal of not only offering a higher sensitivity to rotation, but also loosening the technical challenges of stabilizing its optical path.

In the original reference which first disclosed the configuration of FIGS. 1A and 1B (J. Scheuer and A. Yariv, "Sagnac effect in coupled-resonator slow-light waveguide structures," *Phys. Rev. Lett.* Vol. 96, 053901 (2006)), an expression was presented for its responsivity or sensitivity to rotation. This sensitivity was found to vary as $(N+1)^2$ and as $1/\kappa$. The conclusion that was drawn is that by using a large number of rings and weak coupling, a CROW gyroscope can be made considerably more sensitive than a conventional FOG. The term "slow light" was invoked in that original publication, presumably because the apparent group velocity of the signals traveling through these coupled resonators is greatly reduced (sees e.g., A. Yariv, Y. Xu, R. K. Lee, and A. Scherer, "Coupled-resonator optical waveguide: a proposal and analysis," *Opt. Lett.* Vol. 24, 711-713 (1999)) as the coupling coefficient κ is varied from 1 to very weak values. In many systems, low group velocity implies high sensitivity, since the phase change can be expressed as:

$$\delta\phi=L\cdot\delta k\approx L\cdot\delta\omega\cdot dk/d\omega=L\cdot\delta\omega/v_g$$

where $v_g$ is the group velocity. A small group velocity does not improve the sensitivity to changes in the length L, but it can improve sensitivity to changes in the refractive index n or the frequency ω. In an optical gyroscope, both signals move with the medium, so δω=0 in the gyroscope frame of reference. Confusion on this point can lead to mistakes (see, e.g., Leonhardt et al., Phys. Rev. A 62, 055801 (2000)).

However, as described more fully below, simulations show that in this configuration, slow light has no net benefit, and that this configuration, when properly scaled for fair comparison to a conventional FOG, exhibits at best the same responsivity or sensitivity as a FOG. These simulations were performed in part to assess the best possible rotation sensitivity a CROW gyroscope can have compared to a conventional FOG, assuming similar gyroscope footprints. The responsivity can be expressed as $dP(\Omega)/d\Omega$ where $P(\Omega)$ is the power detected at a rotation rate Ω. These simulations show that although the $(N+1)^2$ dependence of the responsivity or sensitivity predicted by Scheuer et al. is correct, it is only applicable when no external phase bias is applied between the gyroscopes counter-propagating signals. However, it is well known that with such zero phase bias, the sensitivity to first order in rotation rate Ω is zero. Hence the power returning to the detector depends on the next higher (second) order term in the phase difference between the signals, i.e., on the square of the rotation rate. This configuration has therefore a very poor sensitivity to small rotation rates, certainly much poorer than that of a conventional FOG having a coil of similar size.

One option explored in the performance limitation discussion below is to supply a suitable phase bias to the CROW gyroscope and hence make the gyroscope signal proportional to Ω. However, as described below, when a proper phase bias is added, the signal does become proportional to N rather than $N^2$. The CROW gyroscope is then more sensitive to small rotation rates, but its sensitivity is no longer proportional to $(N+1)^2$, but rather to N+1. As a result, the biased CROW gyroscope turns out to have a sensitivity to rotation comparable to that of a conventional FOG or RFOG with the same footprint and the same total propagation loss when N=1, and increasingly smaller relative sensitivity as N increases. The number of rings that maximizes the relative sensitivity of the CROW gyroscope of FIGS. 1A and 1B is N=1, and in this configuration the CROW gyroscope looks sensibly like an RFOG. The conclusion is that the CROW gyroscope of FIGS. 1A and 1B has the same one and only benefit over a FOG as a resonant fiber gyroscope, namely it utilizes a shorter length of waveguide. However, it also has the same disadvantages over a FOG as an RFOG, namely the aforementioned stringent thermal and mechanical path-length stabilization requirements. This significant downside adds great engineering complexity and cost, and it certainly does not outweigh the length advantage. Finally, as discussed below in the performance limitation discussion below, unlike the situation implied in the original publication of Scheuer et al., the apparent lower group velocity of the light traveling through a CROW gyroscope has no bearing on its responsivity or sensitivity. Unfortunately, the CROW gyroscope belongs to the class of sensors that are not enhanced by slow light.

Figure 3:
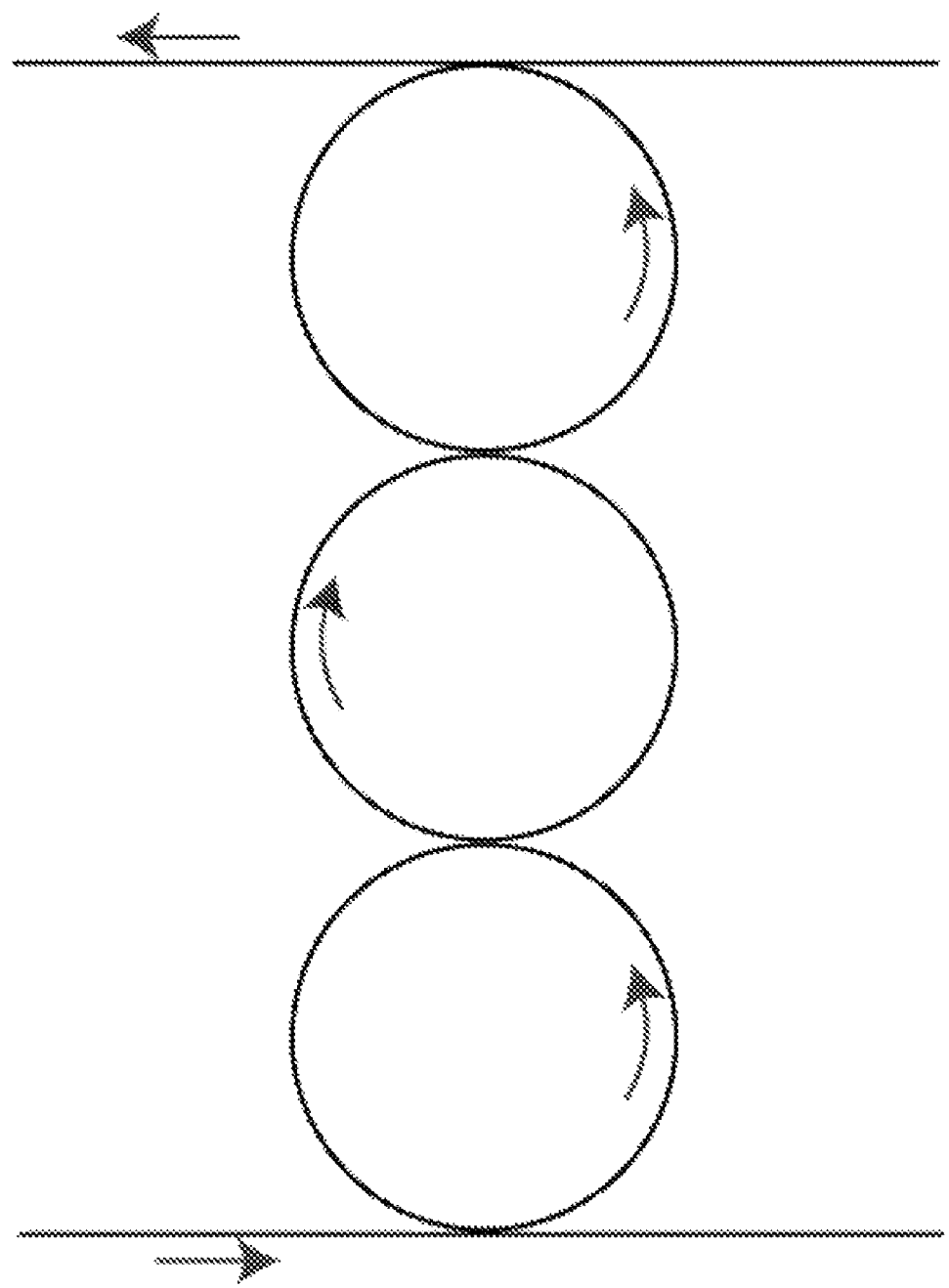
FIG. 3 shows an example conventional CROW gyroscope utilizing a linear array of coupled rings and separate input and output waveguides.
Figure 4:
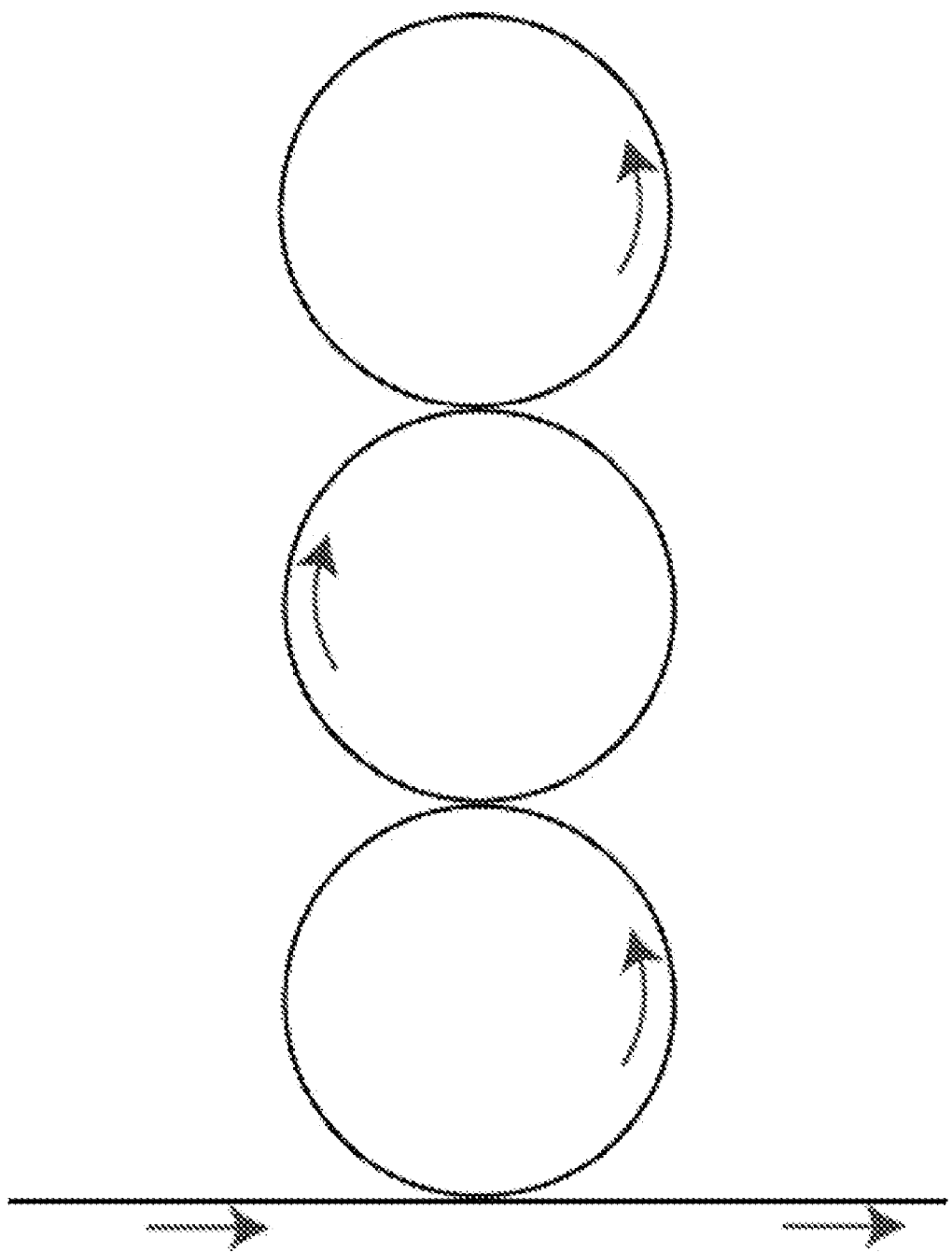
FIG. 4 shows an example conventional CROW gyroscope utilizing a linear array of coupled rings and a single input and output waveguide.

This conclusion applies to two other configurations as well, illustrated in FIGS. 3 and 4, discussed by Steinberg et al, "Rotation Induced Super Structure in Slow-Light Waveguides with Mode Degeneracy: Optical Gyroscopes with Exponential Sensitivity," JOSA B, Vol. 25(5), 1216-

1224, May 2007. In the CROW gyroscope of FIG. 3, the resonators or resonant waveguides are not arranged in a Sagnac loop but in a straight line. Steinberg et al. also unfortunately makes incorrect predictions about this gyroscope performance. The CROW gyroscope of FIG. 4 is similar; the main difference is that the output signal is collected at the end of the same waveguide that supplies light to the coupled resonant waveguides. Unlike claimed in Steinberg et al., first the sensitivity of this CROW gyroscope is unrelated to group index. Second, its sensitivity scales like the total area of the rings, not like their total length, which implies that reducing the rings' radius while keeping their total length constant will yield a reduced sensitivity. Third, the fact that the transmission varies exponentially with rotation rate has no benefit for the sensitivity. Fourth, the presence of a bandgap in the transmission when the device is rotated is not a novel effect (it is present in classical RFOGs), and for equal total loss and area (the proper metric to compare gyroscopes) it does not result in an improvement in sensitivity over a conventional FOG. Finally, again for equal total loss and area, a CROW gyroscope has the same sensitivity as an RFOG. The bottom line is that even if one were to construct a CROW gyroscope with the world's lowest loss waveguide (silica single-mode fibers around 1.5 µm) and hypothetically lossless fiber couplers, the CROW gyroscope of FIG. 3 would not offer any sensitivity advantage over a conventional FOG. Such a CROW gyroscope would, on the other hand, present several significant disadvantages, including lack of reciprocity and the need to stabilize the resonance frequencies of N coupled rings against environmental perturbations to an extreme degree (as mentioned in relation to the CROW gyroscope of FIGS. 1A and 1B).

Several other publications in recent years have described other gyroscope schemes utilizing slow light to purportedly enhance the sensitivity to small rotation rates, and so far most of them have proved to be erroneous. A. B. Matsko et al., "Optical gyroscope with whispering gallery mode optical cavities," *Opt. Commun.* 233, 107 (2004)) introduced another concept that was also ultimately proved incorrect (see, e.g., A. B. Matsko, A. A. Savchenkov, V. S. Ilchenko, and L. Maleki, "Erratum to Optical Gyroscope with whispering gallery mode optical cavities," *Opt. Commun.* 259, 393 (2006); and M. S. Shahriar et al., "Ultrahigh enhancement in absolute and relative rotation sensing using fast and slow light", *Phys. Rev. A*, Vol. 75, 053807 (2007)).

Certain embodiments described herein provide a number of new unidirectional configurations of CROW gyroscopes in which the light travels in the same direction (e.g., cw) in a plurality of adjacent resonant waveguides (e.g., in all or most of the rings). In certain embodiments, these configurations present one significant advantage over all CROW gyroscopes configurations proposed to date, namely a greater sensitivity to rotation rate than a conventional FOG (again, after normalization to the same area and total loss). In addition, in certain embodiments, some of these configurations are folded, as described in greater detail below, which means that they exhibit a smaller footprint and hence easier stabilization of their optical path lengths. These improvements offer the new prospect of optical gyroscopes with performance far superior to that of conventional FOGs. Subsequent publications (see, Chao Peng, Zhengbin Li, and Anshi Xu, "Rotation sensing based on a slow-light resonating structure with high group dispersion," *Applied Optics* Vol. 46, No. 19, 4125-4131, July 2007; and Chao Peng, Zhengbin Li, and Anshi Xu, "Optical gyroscope based on a coupled resonator with the all-optical analogous property of electromagnetically induced transparency," *Optics Express* Vol. 15, No. 7, 3864-3875, 2 Apr. 2007) have also indicated that unidirectional configurations may provide benefits compared to other configurations.

One reason, and perhaps the only reason, why the sensitivity to rotation rate of any of the CROW gyroscopes illustrated in FIGS. 1-4 do not exceed the sensitivity of a conventional FOG is that the light in successive rings travels in opposite directions, namely, alternatively cw and ccw. The implication is that the Sagnac phase shift picked up by the signal as it travels through a given ring is partly cancelled by the Sagnac phase shift picked up by the same signal as it travels through the adjacent ring. The net Sagnac-induced phase shift accumulated by the light signal traveling through the structure (e.g., the clockwise signal in the CROW gyroscope of FIGS. 1A and 1B, or the signal traveling upward through the CROW gyroscope of FIG. 4) is then reduced compared to what it would be if light was to travel in the same direction (e.g., cw), in all or most rings. This can be accomplished by utilizing one of a number of configurations, shown in FIGS. 5A and 6 through 10.

Figure 5A:
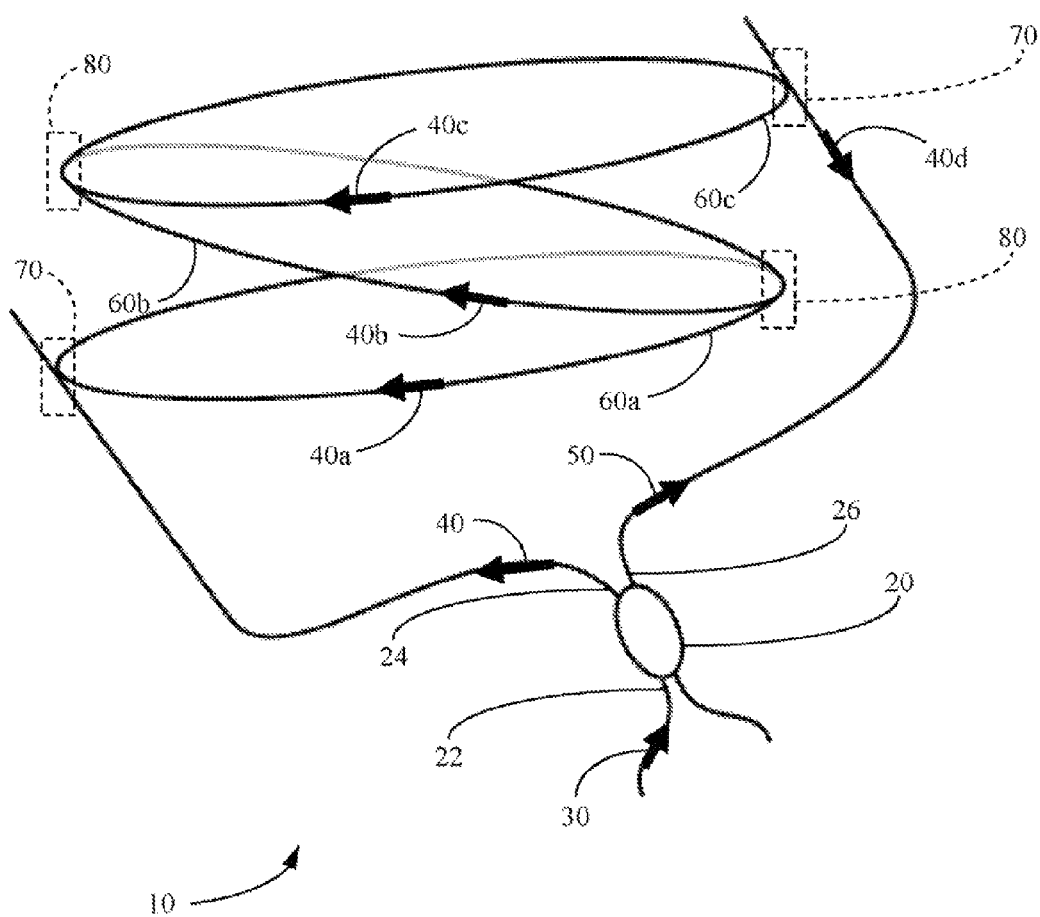
FIG. 5A shows an example folded unidirectional Sagnac-based CROW gyroscope with stacked rings in accordance with certain embodiments described herein.

FIG. 5A schematically illustrates an example optical waveguide gyroscope 10 in accordance with certain embodiments described herein. The gyroscope 10 comprises at least one optical coupler 20 having a first port 22, a second port 24, and a third port 26. The at least one optical coupler 20 is configured to receive a first optical signal 30 at the first port 22, to transmit a second optical signal 40 to the second port 24, and to transmit a third optical signal 50 to the third port 26. The gyroscope 10 further comprises a plurality of resonant waveguides 60 (e.g., resonant waveguides 60a, 60b, 60c of FIG. 5A) optically coupled to the second port 24 and the third port 26. The resonant waveguides 60 are generally adjacent to one another and are optically coupled to one another. At least a portion of the second optical signal 40 propagates from the second port 24 to the third port 26 by propagating through the plurality of resonant waveguides 60. At least a portion of the third optical signal 50 propagates from the third port 26 to the second port 24 by propagating through the plurality of resonant waveguides 60. The at least a portion of the second optical signal 40 propagates through each resonant waveguide 60 of the plurality of resonant waveguides 60 in a clockwise direction and the at least a portion of the third optical signal 50 propagates through each resonant waveguide 60 of the plurality of resonant waveguides 60 in a counterclockwise direction. In certain embodiments, the at least a portion of the second optical signal 40 is received by the third port 26 and the at least a portion of the third optical signal 50 is received by the second port 24. In certain such embodiments, the at least a portion of the second optical signal 40 and the at least a portion of the third optical signal 50 are combined by the at least one optical coupler 20 and transmitted to the first port 22.

In certain embodiments, the gyroscope 10 further comprises at least one injector coupler 70 optically coupling the second port 24 to the plurality of resonant waveguides 60 and at least one injector coupler 70 optically coupling the third port 26 to the plurality of resonant waveguides 60. In certain embodiments, the gyroscope 10 further comprises a plurality of optical couplers 80, with each optical coupler 80 optically coupling two generally adjacent resonant waveguides 60 of the plurality of resonant waveguides 60 to one another. In certain such embodiments, the optical couplers 80 are located between two adjacent resonant waveguides 60 (e.g., between resonant waveguides 60a and 60b, and between resonant waveguides 60b and 60c).

In certain embodiments, the at least one optical coupler 20 comprises a 1×2 optical coupler with three ports or a 2×2 optical coupler with four ports. For example, certain embodiments utilize a 3-dB optical coupler. The at least one optical coupler 20 of certain embodiments splits the first optical signal 30 into the second optical signal 40 and the third optical signal 50. For example, in certain embodiments, the at least one optical coupler 20 directs 50% of the first optical signal 30 to the second optical port 24 as the second optical signal 40 and directs 50% of the first optical signal 30 to the third optical port 26 as the third optical signal 50. In certain embodiments, the at least one optical coupler 20 comprises an optical circulator, an optical splitter, or other optical components. In certain other embodiments, free-space coupling can be used and the at least one optical coupler 20 comprises a partially transmitting mirror. Other types of optical couplers 20 are also compatible with certain embodiments described herein.

In certain embodiments, the first optical signal 30 is generated by a light source (not shown). Examples of light sources compatible with certain embodiments described herein include, but are not limited to, laser sources. In certain embodiments, the light generated by the light source has a linewidth significantly smaller than the width of the resonances of the CROW. In certain embodiments in which the at least a portion of the second optical signal 40 and the at least a portion of the third optical signal 50 are combined by the at least one optical coupler 20, the resultant optical signal is transmitted to an optical detector (not shown). Examples of optical detectors compatible with certain embodiments described herein include, but are not limited to, photodiodes.

In certain embodiments, the resonant waveguides 60 comprise at least one ring waveguide which is configured to allow an optical signal to resonate within (e.g., propagate multiple times around) the resonant waveguide 60. In certain other embodiments, the resonant waveguides 60 comprise at least one microresonator. In certain embodiments, the resonant waveguides 60 can be of one or multiple kinds. For example, at least one of the resonant waveguides 60 can be defined in photonic-bandgap planar structures, conventional waveguides defined by well-established methods such as implantation, diffusion, photolithography, etching, etc., in amorphous, crystalline, or ceramic materials such as silica, phosphate, fluoride, or other glasses, in crystals such as silicon, or in dielectrics or metals. In certain embodiments, the resonant waveguides 60 can also comprise microspheres or conventional optical fiber (e.g., single-mode optical fiber). For silica-based microspheres and silica-based optical fibers, the wavelength range of operation can be about 1.5 µm, a range for which the propagation loss through the silica-based material is minimal, and hence the enhancement in sensitivity described above is at a maximum. Examples of low-loss optical ring resonators compatible with certain embodiments described herein include, but are not limited to, $CaF_2$ resonators, which can have sufficiently low loss (see, e.g., I. S. Grudinin et al., "*Ultrahigh optical Q factors of crystalline resonators in the linear regime*," Phys. Rev. A 74, 063806 (2006), which is incorporated in its entirety by reference herein).

Similarly to the conventional CROW gyroscopes of FIGS. 1A and 1B, in certain embodiments, the number N of resonant waveguides 60 can be odd (e.g., 1, 3, 5, 7, 9). Similarly to the conventional CROW gyroscope of FIG. 2 (e.g., with an appropriate configuration of injector couplers 70), in certain other embodiments, the number N of resonant waveguides 60 can be even (e.g., 2, 4, 6, 8, 10). In certain embodiments, the coupling ratio between adjacent resonant waveguides 60 of the plurality of resonant waveguides 60 is less than one. In certain embodiments, the coupling ratio is comparable to the round-trip loss of the resonant waveguide 60. For example, for low-loss ring resonators (e.g., single-mode fiber at 1.5 µm), the round-trip loss and the coupling ratio can be less than $10^{-4}$.

In certain embodiments, each resonant waveguide 60 of the plurality of resonant waveguides 60 is generally planar, and the resonant waveguides 60 of the plurality of resonant waveguides 60 are generally parallel to one another. For example, each resonant waveguide 60 of the plurality of resonant waveguides 60 can define a normal direction generally perpendicular to the resonant waveguide 60, and the resonant waveguides 60 of the plurality of resonant waveguides 60 can be positioned such that the normal directions are generally parallel with one another.

In certain embodiments, each resonant waveguide 60 of the plurality of resonant waveguides is configured to allow light to propagate through the resonant waveguide 60 in a generally planar path, and the paths of each of the resonant waveguides 60 of the plurality of resonant waveguides 60 are generally parallel to one another. In certain such embodiments, each generally planar path has a normal direction generally perpendicular to the path, and the resonant waveguides 60 are positioned such that the normal directions of the paths are generally coincident with one another.

In certain embodiments, the resonant waveguides 60 are generally planar with one another. For example, in certain embodiments, the resonant waveguides 60 are positioned such that the generally planar paths of the plurality of resonant waveguides 60 are in a common plane. In certain such embodiments, the resonant waveguides 60 are stacked above one another or folded on top of each other (e.g. the normal directions of the resonant waveguides 60 are coincident with one another). For example, the gyroscope 10 schematically illustrated by FIG. 5A is a folded unidirectional Sagnac-based CROW gyroscope 10 with stacked rings. In certain embodiments, the resonant waveguides 60 lie substantially flat over or on top of each other (e.g., having a zero angle between adjacent resonant waveguides 60). In certain other embodiments, at least two adjacent resonant waveguides 60 have a non-zero angle with respect to each other. FIG. 5A shows a non-zero angle between adjacent resonant waveguides, mostly for clarity of the figure. A small angle between resonant waveguides 60, of any value, is acceptable, however the larger this non-zero angle, the lower the directionality of the gyroscope 10, and the weaker the responsivity or sensitivity of the gyroscope 10.

In certain embodiments (see, e.g., FIG. 5A), the at least one injector coupler 70 optically coupling the second port 24 to the plurality of resonant waveguides 60 comprises a portion of a waveguide sufficiently close to a portion of a resonant waveguide 60 to allow at least a portion of an optical signal to propagate between the waveguide portion and the resonant waveguide 60. Similarly, in certain embodiments (see, e.g., FIG. 5A), the at least one injector coupler 70 optically coupling the third port 26 to the plurality of resonant waveguides 60 comprises a portion of a waveguide sufficiently close to a portion of a resonant waveguide 60 to allow at least a portion of an optical signal to propagate between the waveguide portion and the resonant waveguide 60. In certain embodiments (see, e.g., FIG. 5A), the plurality of optical couplers 80 comprises at least one optical coupler 80 comprising portions of two adjacent resonant waveguides 60 (e.g., resonant waveguides 60*a* and 60*b*) which are sufficiently close to one another to allow at least a portion of an optical signal to propagate between the two adjacent resonant waveguides 60.

The principle of the unidirectional CROW gyroscope 10 of FIG. 5A are similar to that of the configuration of FIGS. 1A and 1B. To understand the configuration of FIG. 5A, reference can be made first to the CROW gyroscope of FIGS. 1A and 1B. For simplicity, while it is not a requirement of the CROW gyroscope of FIGS. 1A and 1B, it can be assumed that the rings or resonant waveguides are all centered on a circle of radius $R_0$, as shown in FIGS. 1A and 1B. As demonstrated in the performance limitation discussion below, the rotation-induced signal in the gyroscope of FIGS. 1A and 1B originates from two components. One is the fact that the counter-propagating signals have traveled around a large loop (circular, and of radius $R_0$, in this example), and thus they have picked up a differential Sagnac phase shift proportional to the area of this loop, which is labeled B as described above. The second contribution is the resonant Sagnac phase shift collected by each of the cw and ccw signals as they propagate through the resonant rings. The performance limitation discussion below shows that provided the coupling ratio between rings is reasonably low, or equivalently that the finesse of the (identical) ring resonators is sufficiently high, this second contribution is much larger than the first contribution.

Figure 5B:
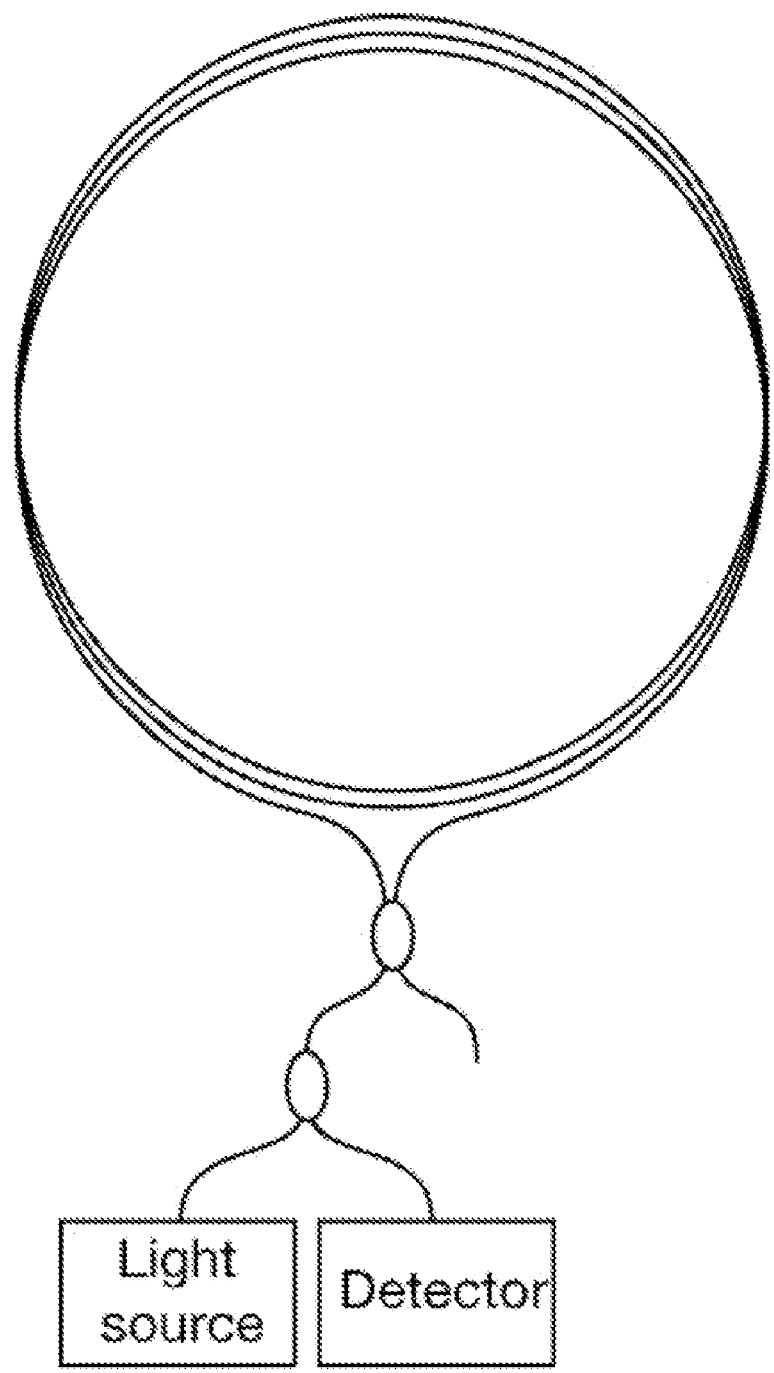
FIG. 5B shows a conventional fiber optical gyroscope with the same total area and loss as the unidirectional Sagnac-based CROW gyroscope with stacked rings of FIG. 5A.

By folding the rings or resonant waveguides 60 as shown in FIG. 5A, the area enclosed by the rings (B) has been reduced to zero, so the first contribution to the rotation-induced signal vanishes, but since it is negligible compared to the resonant contribution, the net rotation-induced signal has not been compromised. In fact, the net rotation-induced signal has increased. The reason is that because of the way the resonant waveguides 60 are arranged in this configuration, the signal traveling, for example, cw around this collapsed loop, travels cw with respect to the direction of the rotation applied to the structure in every single one of the resonant waveguides 60. For example, as schematically illustrated in FIG. 5A, at least a portion 40a of the second optical signal 40 is coupled from the second port 40 into the resonant waveguide 60a, at least a portion 40b is coupled from resonant waveguide 60a into the resonant waveguide 60b, at least a portion 40c is coupled from resonant waveguide 60b into resonant waveguide 60c, and at least a portion 40d is coupled from resonant waveguide 60c into the third port 26. Each of the portions 40a, 40b, and 40c propagating through the resonant waveguides 60a, 60b, and 60c travel is the same direction (e.g., cw) as one another. Therefore instead of partially subtracting from each other, all of these contributions actually add. In turns, everything else being the same (in particular the ring size or area, number of rings, waveguide loss, and coupling ratio κ), this yields a much stronger signal for a given rotation rate than in the configuration of FIGS. 1A and 1B. In conclusion, the unidirectional CROW gyroscope 10 of FIG. 5A has a greater sensitivity than the corresponding conventional FOG (schematically illustrated in FIG. 5B) with a length of fiber wrapped around the same footprint, and with the same total loss.

Figure 6:
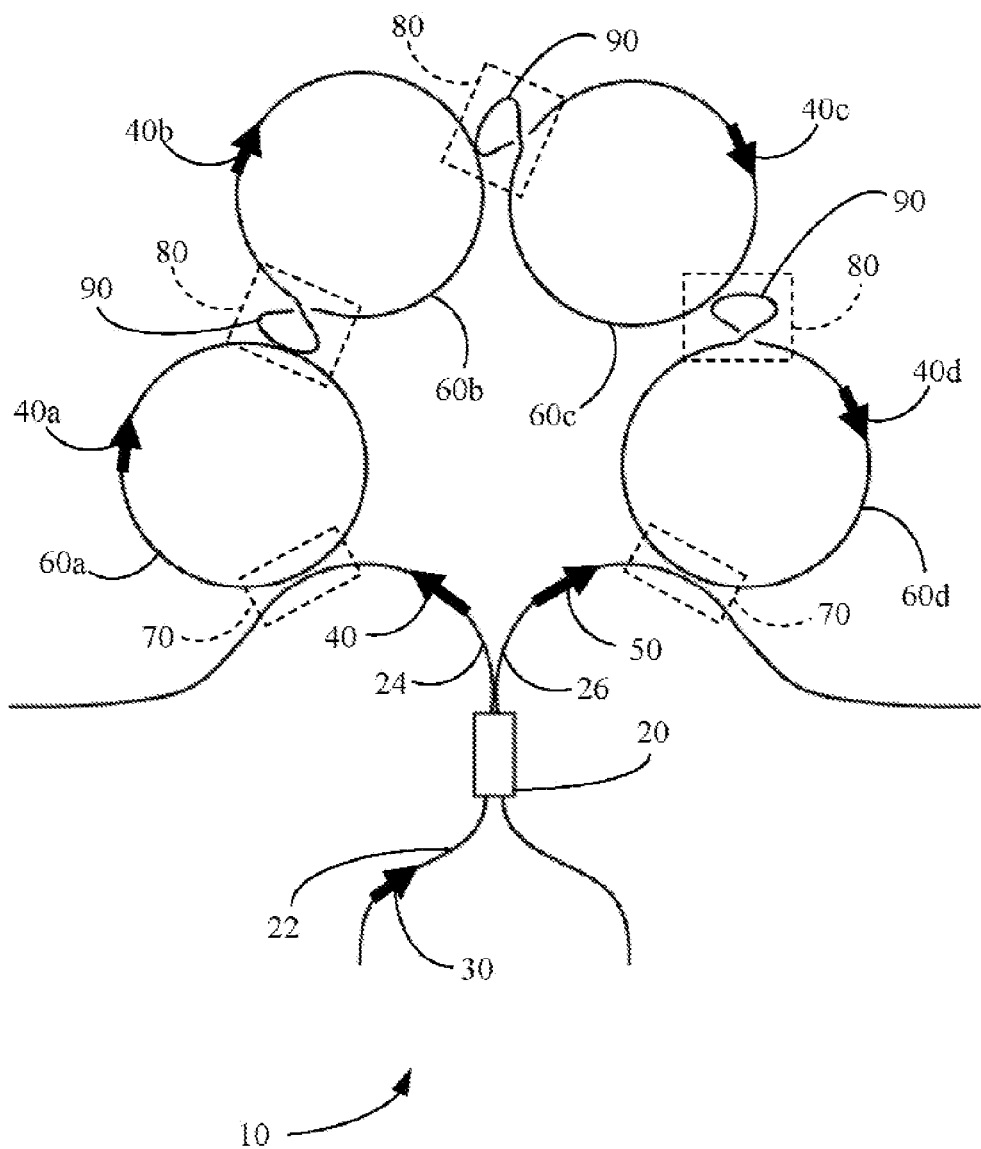
FIG. 6 shows an example unidirectional Sagnac-based CROW gyroscope with twisted rings in accordance with certain embodiments described herein.

FIG. 6 schematically illustrates another example optical waveguide gyroscope 10 (e.g., a unidirectional Sagnac-based CROW gyroscope) in accordance with certain embodiments described herein. The gyroscope 10 comprises at least one optical coupler 20 and a plurality of resonant waveguides 60 (e.g., resonant waveguides 60a-60d of FIG. 6) generally adjacent to one another and optically coupled to one another. In certain embodiments, each resonant waveguide 60 of the plurality of resonant waveguides 60 is generally planar, and the resonant waveguides 60 of the plurality of resonant waveguides 60 are generally planar with one another. At least one optical coupler 80 of the plurality of optical couplers 80 comprises a coupling portion 90 of a first resonant waveguide 60 (e.g., resonant waveguide 60b) of the plurality of resonant waveguides 60. The coupling portion 90 is generally adjacent to, and optically coupled to, a second resonant waveguide 60 (e.g., resonant waveguide 60a) of the plurality of resonant waveguides 60. The coupling portion 90 of certain embodiments comprises two sections of the first resonant waveguide 60 that cross over one another. For example, as schematically illustrated in FIG. 6, the coupling portion 90 of resonant waveguide 60b comprises a 180 degree twist of the resonant waveguide 60b. In certain such embodiments, the first resonant waveguide 60 is generally planar and generally surrounds a first area, and the coupling portion 90 between the twist and the second resonant waveguide 60 is generally planar and generally surrounds a second area smaller than the first area. For example, in certain embodiments, the second area is less than 10% of the first area. In certain embodiments, the second area is smaller than the first area, but not so small as to induce a significant bending loss in the fiber. For example, in a practical fiber-based device, the minimum diameter for the twisted section of the coupling portion 90 is a few millimeters. In certain embodiments, the sizes of the twisted sections of the coupling portions 90 are substantially equal to one another so that the resonant waveguides 60 are substantially identical to one another.

Figure 7:
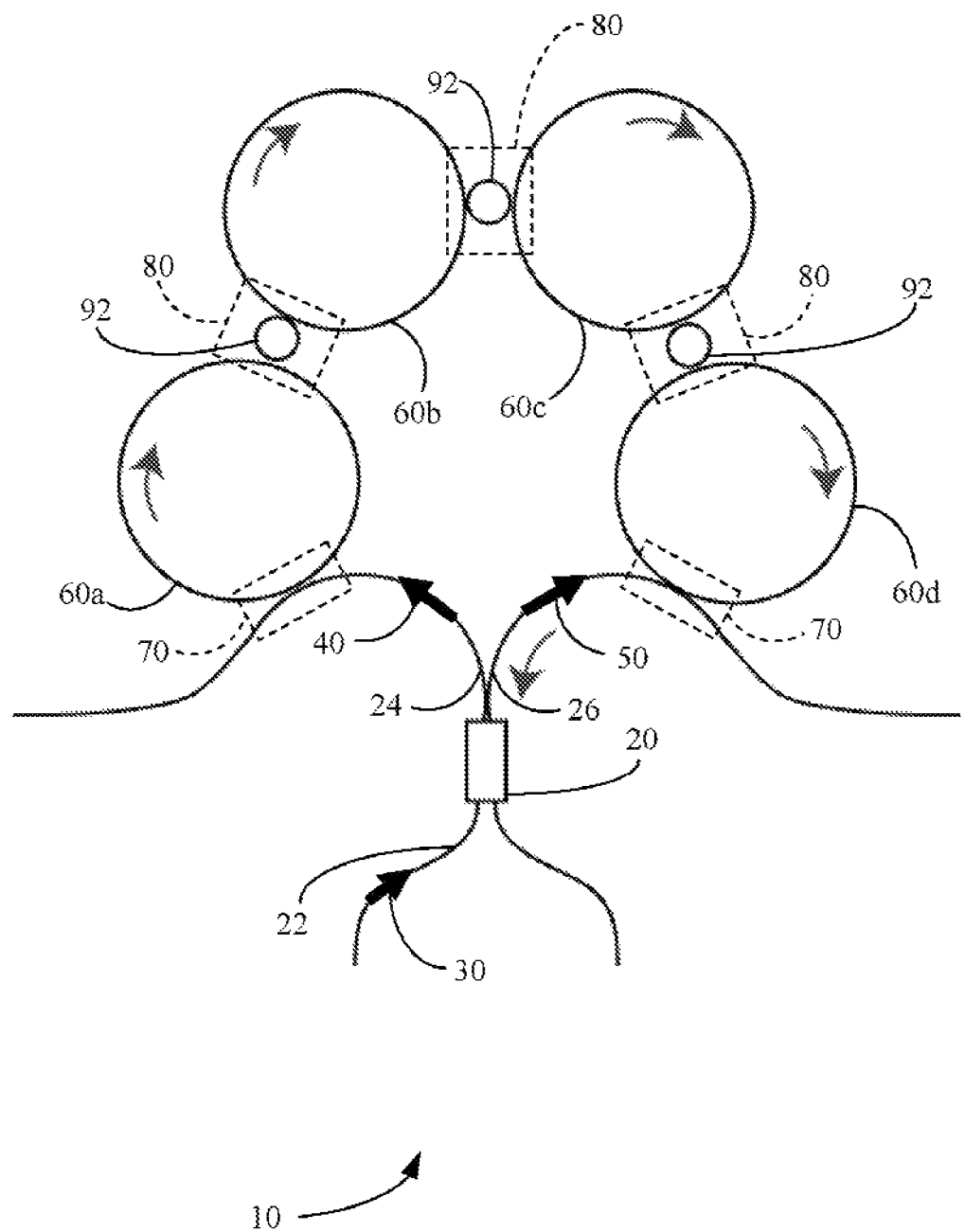
FIG. 7 shows an example unidirectional Sagnac-based CROW gyroscope with small interstitial rings in accordance with certain embodiments described herein.

FIG. 7 schematically illustrates another example optical waveguide gyroscope 10 (e.g., a unidirectional Sagnac-based CROW gyroscope) in accordance with certain embodiments described herein. The gyroscope 10 comprises at least one optical coupler 20 and a plurality of resonant waveguides 60 (e.g., resonant waveguides 60a-60d of FIG. 6) generally adjacent to one another and optically coupled to one another. In certain embodiments, each resonant waveguide 60 of the plurality of resonant waveguides 60 is generally planar, and the resonant waveguides 60 of the plurality of resonant waveguides 60 are generally planar with one another. At least one optical coupler 80 of the plurality of optical couplers 80 comprises a ring resonator 92 generally adjacent to, and optically coupled to, a first resonant waveguide 60 (e.g., resonant waveguide 60b) of the plurality of resonant waveguides 60 and a second resonant waveguide 60 (e.g., resonant waveguide 60a) of the plurality of resonant waveguides 60. In certain embodiments, the ring resonator 92 is generally circular, while in certain other embodiments, the ring resonator 92 has other shapes. In certain embodiments, the first resonant waveguide 60 is generally planar and generally surrounds a first area, the second resonant waveguide 60 is generally planar and generally surrounds a second area, and the ring resonator 92 is generally planar and generally surrounds a third area smaller than the first area and smaller than the second area. For example, in certain embodiments, the third area is less than 10% of the first area and the third area is less than 10% of the second area. In certain embodiments, the third area is smaller than either the first area or the second area, but not so small as to induce a significant bending loss. In certain embodiments, the sizes of the ring resonators 92 are substantially equal to one another.

The above discussion regarding the propagation of optical signals through the gyroscope 10 is applicable to certain embodiments utilizing the configurations of FIGS. 6 and 7 as well. In FIG. 6, alternating reversal of the direction of rotation of the optical signals propagating through the ring with respect to the direction of the rotation applied to the structure is effected by flipping a portion of every other ring by 180° to create a coupling portion 90. In FIG. 7, it is accomplished by inserting a ring resonator 92 of small diameter between each adjacent ring or resonant waveguide 60. The area of the small ring resonator 92 is negligible compared to the area of the main rings or resonant waveguides 60, for example, only 10% of the area of the main rings or resonant waveguides 60.

In certain embodiments, at least one optical coupler 80 of the plurality of optical couplers 80 comprises the ring resonator 92, a portion of the first resonant waveguide 60, and a portion of the second resonant waveguide 60. In certain such embodiments, the optical coupling between the small ring resonator 92 and one of the portions of the two resonant waveguides 60 has a low coupling coefficient κ, determined in the same manner as in the CROW gyroscope of FIGS. 1A and 1B. The optical coupling between the small ring resonator 92 and the other portion of the two portions of the two resonant waveguides 60 has a coupling ratio of substantially 100%. The higher the better; the difference between 100% and the actual value amounts to an undesirable loss, but the device will still function well. In certain embodiments, this additional loss is equal to or smaller than the value of the round-trip loss of the optical signal propagating through a resonant waveguide 60. In this manner, light couples from a first resonant waveguide 60 to the next small ring resonator 92 with a low coupling coefficient κ, and from there on this signal travels in a strongly-asymmetric "figure-8" through the small ring resonator/second resonant waveguide 60. The process repeats itself all the way across the structure. As schematically illustrated in FIGS. 6 and 7 for the cw-traveling signal (e.g., the second optical signal 40 and the portions 40a, 40b, 40c, 40d propagating around each of the resonant waveguides 60a, 60b, 60c, 60d, respectively), light in adjacent resonant waveguides 60 clearly travels in the same direction, namely, cw. For the ccw-traveling signal, not shown for clarity, light in adjacent resonant waveguides 60 also travels in the same direction, but now ccw.

Figure 8:
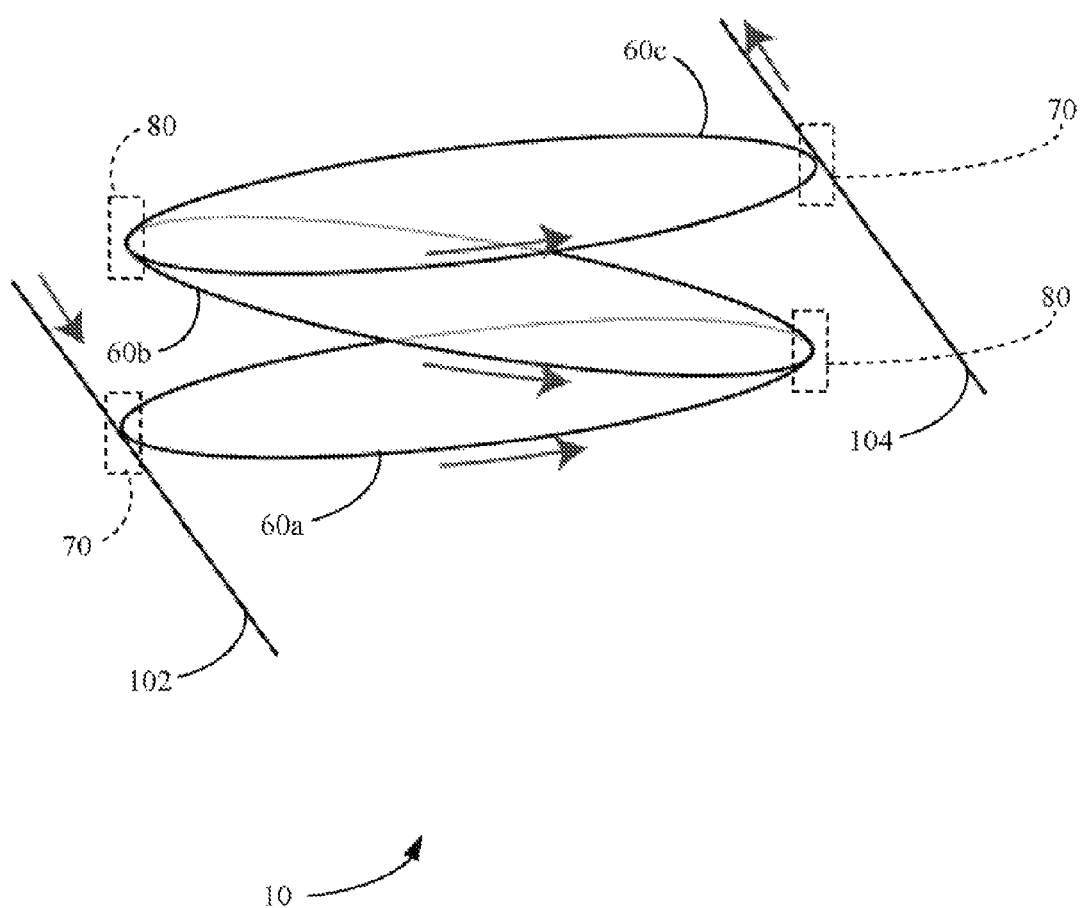
FIG. 8 shows an example folded unidirectional linear CROW gyroscope with stacked rings in accordance with certain embodiments described herein.
Figure 9:
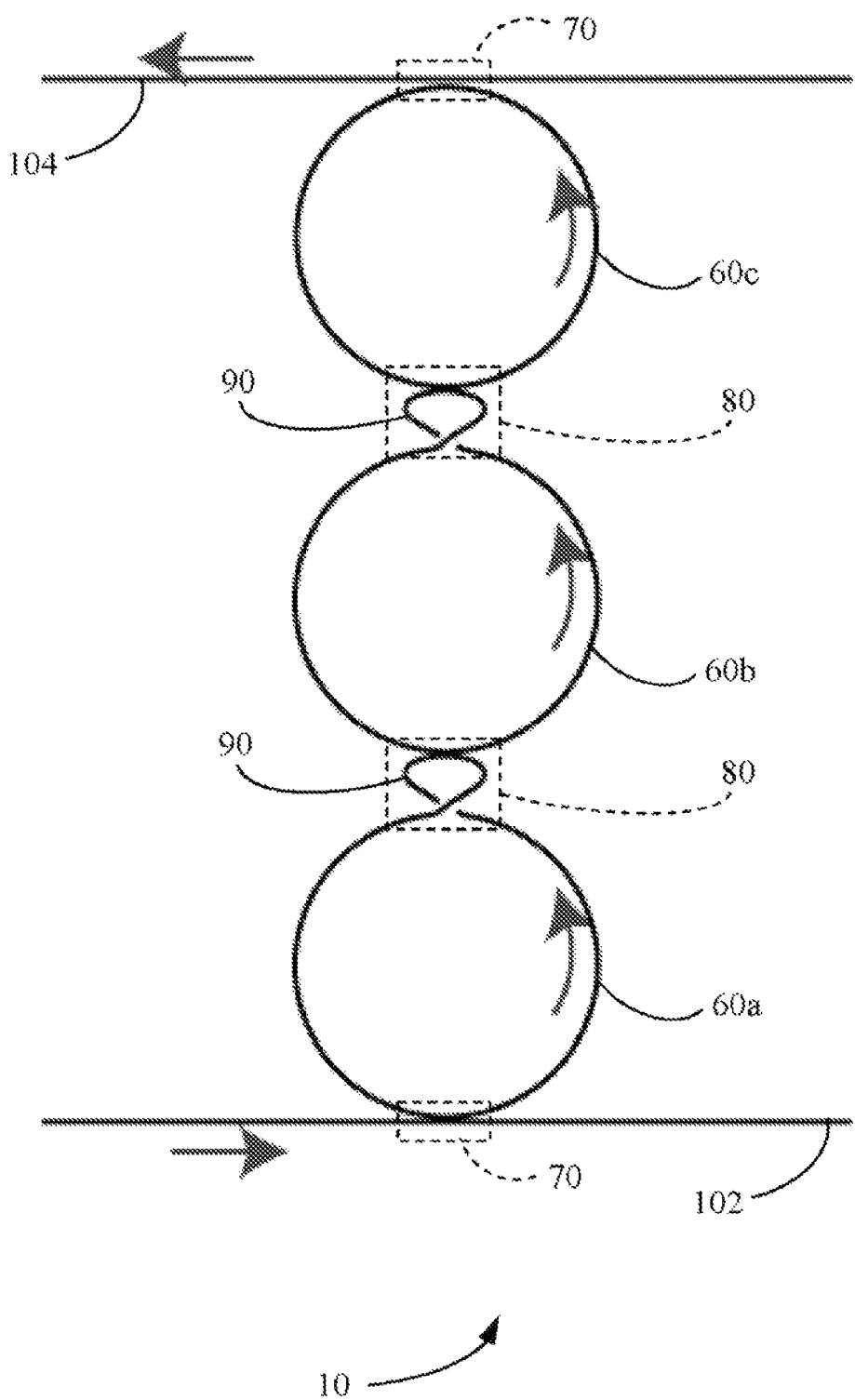
FIG. 9 shows an example unidirectional linear CROW gyroscope with twisted rings in accordance with certain embodiments described herein.
Figure 10:
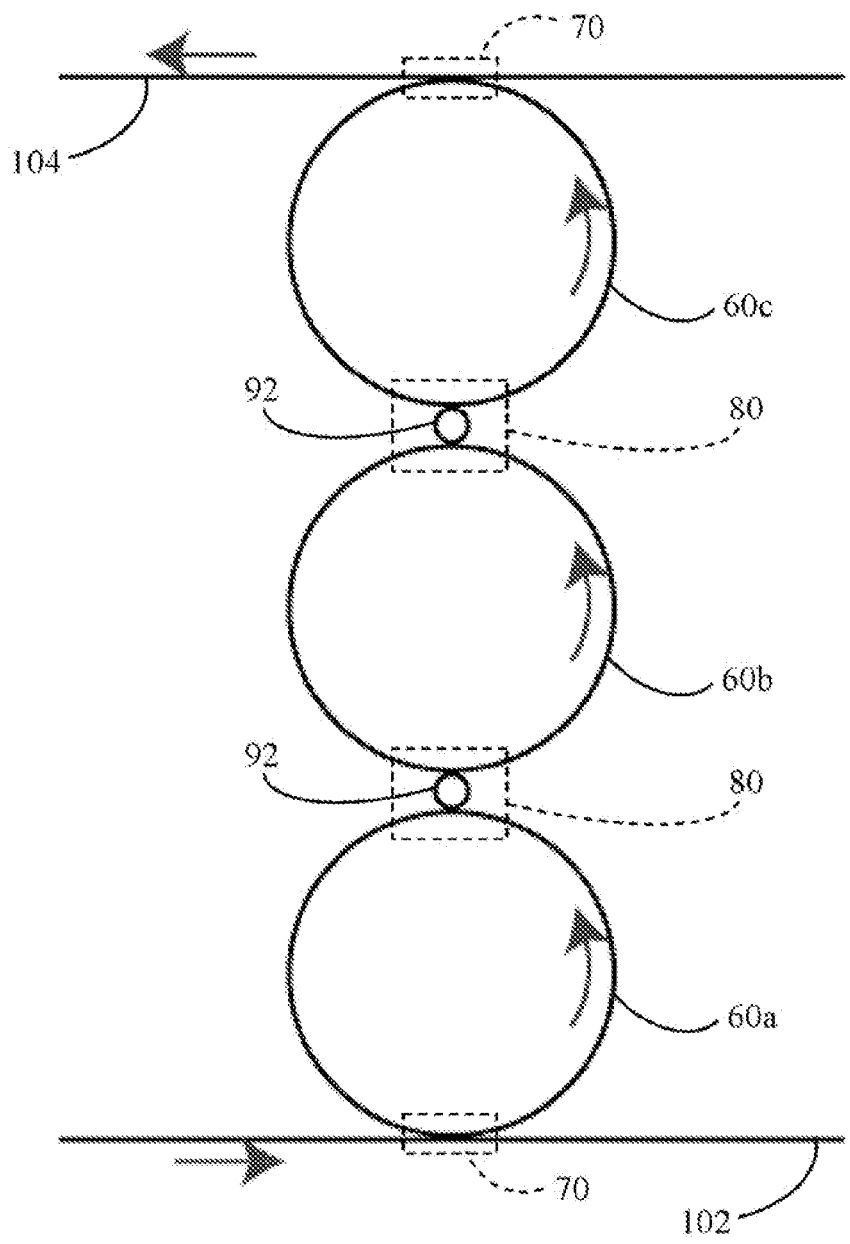
FIG. 10 shows an example unidirectional linear CROW gyroscope with small interstitial rings in accordance with certain embodiments described herein.

FIG. 8 shows another example optical waveguide gyroscope 10 (e.g., a unidirectional linear CROW gyroscope) with folded or stacked resonant waveguides 60 or rings in accordance with certain embodiments described herein. FIG. 9 shows another example optical waveguide gyroscope 10 (e.g., a unidirectional linear CROW gyroscope) with twisted coupling portions 90 in accordance with certain embodiments described herein. FIG. 10 shows another example optical waveguide gyroscope 10 (e.g., a unidirectional linear CROW gyroscope) with small interstitial ring resonators 92 in accordance with certain embodiments described herein. In certain embodiments, the plurality of resonant waveguides 60 are optically coupled to at least one waveguide. For example, as schematically illustrated by FIGS. 8, 9, and 10, one of the resonant waveguides 60 of the plurality of resonant waveguides 60 is optically coupled to a first waveguide 102 and one of the resonant waveguides 60 of the plurality of resonant waveguides 60 is optically coupled to a second waveguide 104. In certain embodiments, the resonant waveguides 60 are positioned along a generally straight line, while in certain other embodiments, the resonant waveguides 60 are positioned along a generally curved line.

The same discussion regarding the propagation of optical signals through the gyroscope 10 applies to certain embodiments utilizing the linear CROW gyroscopes 10 of FIGS. 8, 9, and 10. Here again, the rings or resonant waveguides 60 can be stacked, twisted portions 90, or smaller interstitial ring resonators 92 can be added as described above to force light to circulate in the same direction (e.g., cw) in a plurality of resonant waveguides 60 (e.g., in all or most of the resonant waveguides 60). Similar unidirectional optical waveguide gyroscopes 10 can be configured to have a linear array of coupled resonant waveguides 60 with a single waveguide for inputting and outputting signals to the plurality of resonant waveguides 60, in a manner similar to that of the conventional CROW gyroscope of FIG. 4. Such unidirectional optical waveguide gyroscopes 10 look just like the ones shown in FIGS. 8, 9, and 10, except that in each case the second waveguide 104 is not present and the output is read at the port opposite the input port.

In certain embodiments, some of the unidirectional configurations described above, for example, those of FIGS. 5A and 8 (as well as FIG. 8 without the second waveguide 104), also exhibit a significant stability improvement over the other unidirectional configurations. The reason is that in these gyroscopes, the rings or resonant waveguides 60 are positioned over (e.g., folded on top of) each other. Consequently, they physically occupy a smaller volume, and it is easier to control their mean temperature and reduce temperature gradients than in other non-folded configurations. Variations in mean temperature and variations in temperature gradients are detrimental in certain embodiments of these sensors because they modify the resonance frequencies of the rings or resonant waveguides 60, which in turn modify the output power at the output port of the sensor in a manner that is undistinguishable from a variation in rotation-induced signal.

In certain embodiments, one or more of the CROW gyroscopes 10 shown in FIGS. 5A, 6-10 is operated in a reciprocal mode of operation, namely, through which two signals travel in opposite directions, as well as folded. As a result of the reciprocal operation, the two signals are nominally exposed to the same external reciprocal perturbations. Such perturbations include, but are not limited to, refractive index or length changes in the waveguide(s) due to external temperature changes that are slow compared to the time of flight of light through the structure. This effect is well known in FOGs, as described, for example in H. Lefèvre, *The Fiber-Optic Gyroscope*, Ch. 6, Artech House, Boston (1993). The structure is then less susceptible to mean temperature variations, and to variations in temperature gradients, as well as acoustic waves and vibrations. The folded configuration, as explained above, makes it easier to stabilize the structure in temperature. FIG. 5A shows an example CROW gyroscope 10 that satisfies this advantageous feature in accordance with certain embodiments described herein.

Certain other embodiments utilize a CROW gyroscope 10 having a configuration that includes the second, but not the first, feature, namely, which are folded (e.g., the CROW gyroscopes 10 of FIGS. 5A and 8, and the one of FIG. 8 without the second waveguide 104) but which are not operated in a reciprocal mode.

Another significant benefit of certain embodiments of the unidirectional configurations described herein is that they can be designed to be much smaller than a conventional FOG yet exhibit the same sensitivity. In certain such embodiments, the smaller size but comparable sensitivity to conventional FOG systems can be accomplished by reducing the number of coupled rings or resonant waveguides 60. In other words, although certain embodiments can be used to produce a gyroscope with the same footprint as a FOG but a superior sensitivity to rotation, it can also be designed to produce a gyroscope with either a smaller footprint and/or a smaller number of rings or resonant waveguides but the same responsivity or sensitivity. Any configuration between these two extremes is also possible.

Discussion of Performance Limitations of a Conventional CROW Gyroscope

The following performance limitation discussion (see, M. A. Terrel et al., "*Performance Limitation of a Coupled Resonant Optical Waveguide Gyroscope*," J. Lightwave Tech., Vol. 27, No. 1, pp. 47-54 (2009), which is incorporated in its entirety by reference herein), utilizing theoretical analysis, shows that unlike predicted by others, a conventional unbiased coupled resonant optical waveguide (CROW) gyroscope made of N ring resonators has a responsivity or sensitivity to a rotation rate Ω that is proportional to $(N\Omega)^2$, and hence its responsivity or sensitivity to small rotation rates is vanishingly small. In addition, when proper phase bias is applied to the conventional CROW gyroscope, this sensitivity becomes proportional to NΩ and is then considerably larger. However, even after optimizing the CROW gyroscope parameters (N and the ring-to-ring coupling coefficient κ), the conventional CROW gyroscope is always less sensitive than a conventional fiber optic gyroscope (FOG) with the same loop loss, detected power, and footprint. This maximum sensitivity is achieved for N=1, i.e., when the conventional CROW gyroscope closely resembles a resonant FOG. The only benefit of a conventional CROW gyroscope is therefore that it utilizes a much shorter length of fiber, by a factor of about 1/(2κ), but at the expense of a stringent control of the rings' optical path lengths, as in a resonant FOG. The slower apparent group velocity of light in a conventional CROW gyroscope compared to a FOG is unrelated to this shorter length requirement.

As discussed above, for the conventional CROW gyroscope to work optimally, (1) all the rings must have a common resonance frequency at all time, (2) the frequency of the interrogating light must remain tuned to this common resonance frequency at rest, and (3) the linewidth of the light signal must be substantially narrower than the linewidth of the resonant modes of each resonator. Achieving these conditions is done using tight control of the optical path length, index, and transverse dimensions of all N rings simultaneously, which constitutes a significant engineering challenge in practice. However, since the goal of this study is to investigate the validity of the claimed superiority of the ultimate theoretical sensitivity of this sensor, and since similar conditions have been successfully met for the RFOG, in the discussion below assumes that these conditions are satisfied.

Figure 11:
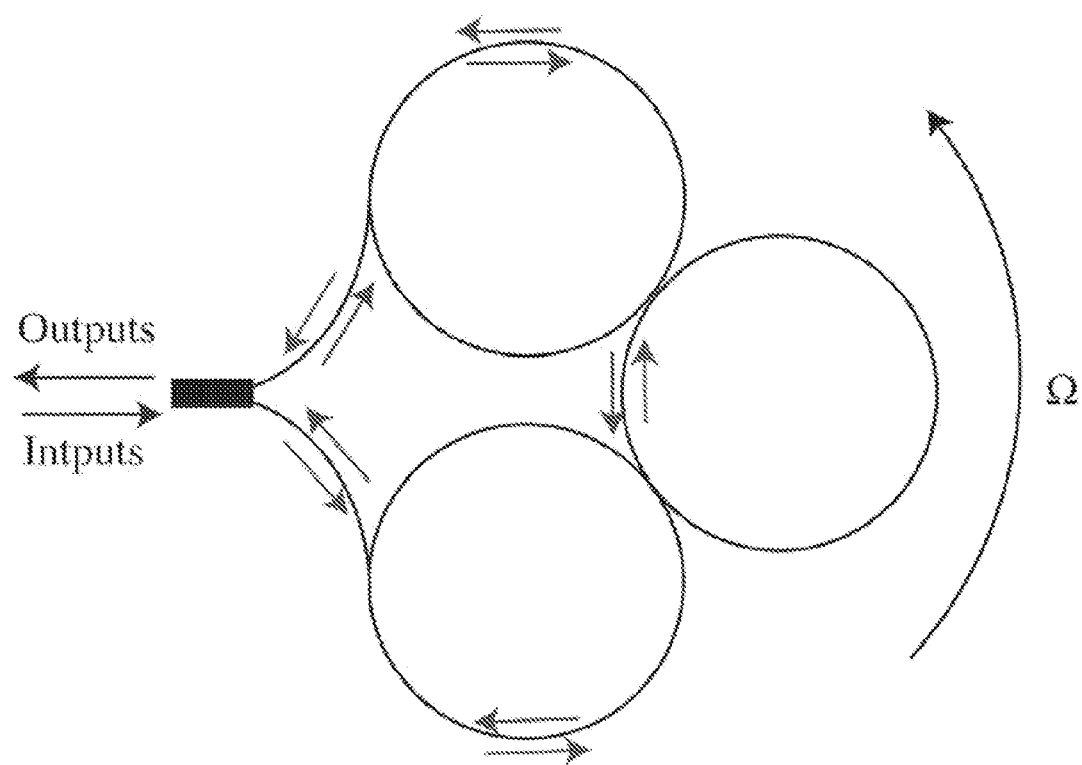
FIG. 11 schematically illustrates an example conventional CROW gyroscope with three rings rotating at frequency $\Omega$.

When the device is rotating at frequency Ω (as schematically illustrated by FIG. 11), the signal going clockwise through a ring accumulates different phase than the signal going counterclockwise through the ring. This is the well-known Sagnac effect. Careful analysis is important when the path is not a closed loop. The Sagnac effect is included in the propagation transfer matrices. In a CROW gyroscope of certain embodiments, a 3-dB coupler divides light into two signals, with one signal propagates along a path rotating with the device and the other signal propagates along a path rotating against the device. After traversing the CROW, the signals are recombined, and the Sagnac phase shift leads to interference between the two signals. Similarly to a regular FOG, a CROW gyroscope is reciprocal in that the two signals propagate along the same path but in opposite directions (common-mode rejection applies). The reciprocal configuration increases stability, and the resonators are kept on resonance by a high stability.

Figure 12:
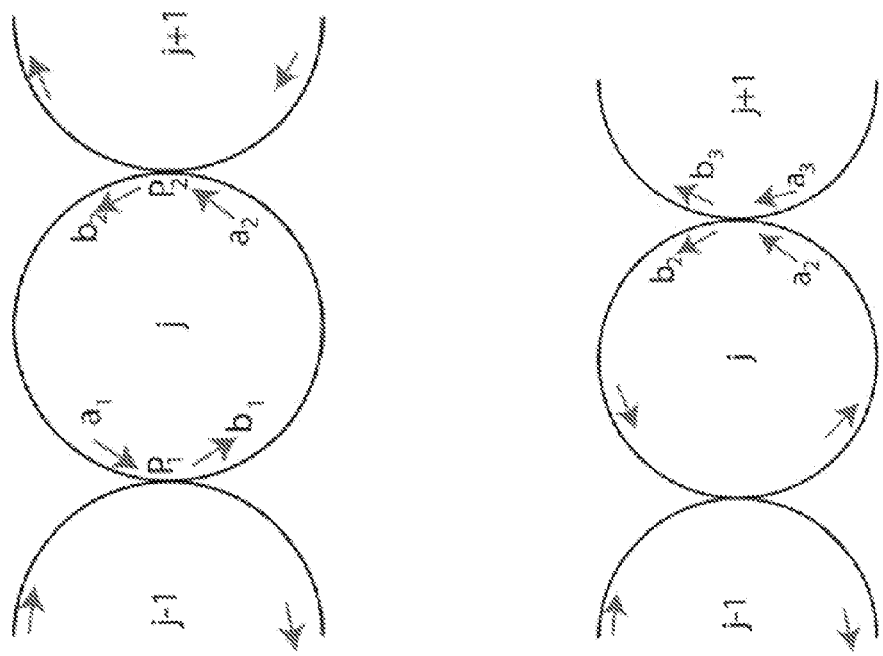
FIG. 12 schematically illustrates the matrix formalism for the transfer-matrix calculations.

To model the sensitivity to rotation of a CROW gyroscope, the transfer-matrix method can be used. The transfer-matrix method keeps track of the total phase each signal accumulates as it propagates from one coupler to the next inside the CROW gyroscope. For example, referring to FIG. 12, using a matrix formalism, each CROW segment can be broken into two parts: $M_{ring}=M_2 M_1$. $M_1$ governs propagation within a ring between $P_1$ and $P_2$, and $M_2$ governs transmission from ring j into ring j+1. Additionally, a matrix $M_{co}$, connects the co-propagating input and output, and another matrix $M_{ctr}$ connects the counter-propagating input and output. The overall transfer matrix for the CROW gyroscope is obtained by multiplying the matrices for each component of the device. The phase difference between the co-propagating and counter-propagating signals is a function of the rotation rate of the device: $\Delta\phi=\Delta\phi(\Omega)$. Note that full matrix analysis shows that the Sagnac effect in adjacent rings does not cancel, even though the signal changes directions from one ring to the next.

The total phase consists of both a rotation-independent component and a rotation-dependent component due to the special-relativistic Fresnel drag experienced by a signal in a moving material. (J. Scheuer and A. Yariv, "Sagnac effect in coupled-resonator slow-light waveguide structures," *Phys. Rev. Lett.* Vol. 96, 053901 (2006), and Post, E. J. "Sagnac Effect", *Rev. Mod. Phys.* Vol. 39, 475 (1967)) The transfer matrix of each element in the gyroscope (portion of a ring between couplers) was expressed as a function of the ring radius R, the effective index of the ring mode n, the power coupling coefficient between rings κ the rotation rate Ω, and the signal frequency ω. The matrix of the total gyroscope is then simply the product of these matrices. For a given input electric field coupled into the gyroscope loop, this final matrix provides a means for calculating the electric fields interfering at the output coupler. From these two fields, the rotation-induced Sagnac phase shift Δφ was then easily determined, for an arbitrarily number of rings N. The sensitivity was then calculated by inserting the Sagnac phase shift in the expression for the basic response of a Sagnac interferometer, which takes into account the phase bias of the interferometer.

The product of the transfer matrices was evaluated by one of two methods. In the first method, MATLAB was used to calculate this product numerically after assigning a value to each parameter. This approach works for any arbitrarily high number of rings.

The second method included multiplying the transfer matrices symbolically using Mathematica, which yielded a closed-form analytical expression for the output electric field versus rotation rate. This approach allowed the visualization of the analytic dependence of the CROW FOG phase shift on the sensor parameters, in particular κ and N, which provides some guidance into the physics of this FOG. For example, for N=1 and N=3 this approach yielded the following exact expressions for the electric field of the co-rotating output signal:

$$E_{out}^{co}(N=1) = \frac{\kappa e^{iF(-cn(\alpha-3\pi)+3D(\pi-\alpha)R\Omega-6R_0\Omega\cos(\alpha/2))/(2\pi)}}{e^{iFR\Omega}+(\kappa-1)e^{iFcn}} \quad (1)$$

$$E_{out}^{co}(N=3) = \frac{\kappa^2 e^{iF(-cn(\alpha-5\pi)+5R\Omega(\pi-\alpha)-10R_0\Omega\cos(\alpha/2))/(2\pi)}}{e^{i2FR\Omega}+(\kappa-1)\left(\begin{array}{c} 2e^{iF(cn+R\Omega)} - \\ 2e^{i2F(cn+R\Omega)}+e^{iF(3cn+R\Omega)}+ \\ e^{iF(cn+3R\Omega)}+(\kappa-1)e^{i2Fcn} \end{array}\right)} \quad (2)$$

where c is the speed of light in vacuum and $F=2\pi R\omega/c^2$. The corresponding expressions for the counter-rotating signal are the same, except that Ω is changed into −Ω. The total electric field at the coupler is the sum of the co- and counter-rotating signals.

This analytical approach becomes increasingly unyielding for larger values of N, and it was therefore not pursued for values of N larger than 3. However, in the important limit of small rotation rates $(\Omega<\Omega_0)/(N+1)$, where $\Omega_0=\kappa c^2\omega^{-1}R^{-2}$), the phase of the electric fields given in Eqs. (1)-(2) can be expanded in a Taylor series to first order in $\in=\Omega/\Omega_0/(N+1))$. Comparison between these two expansions, one valid for N=1 and the other for N=3, suggests the following expression for the dependence on N (to first order in ∈) of the Sagnac phase shift:

$$\Delta\phi_{CROW} = \frac{4\pi R^2 \omega \Omega}{c^2}\left(\frac{N+1}{2\kappa} + \frac{2\cot(\alpha/2) + \alpha - \pi}{\alpha}\right) \quad (3)$$

where $\alpha=2\pi/(N+2)$ is the angle subtended by each ring from the center of the gyroscope loop. Note that Eq. (3) states that the phase delay is independent of the refractive index of the fiber. This is in strict agreement with the well-known fact established by Arditty and Lefèvre (H. J. Arditty and H. C. Lefèvre, "Sagnac effect in fiber gyroscopes," *Opt. Lett.* Vol. 6, 401-403 (1981)) using relativistic arguments that the response of a gyroscope is independent of the material index.

Figure 13:
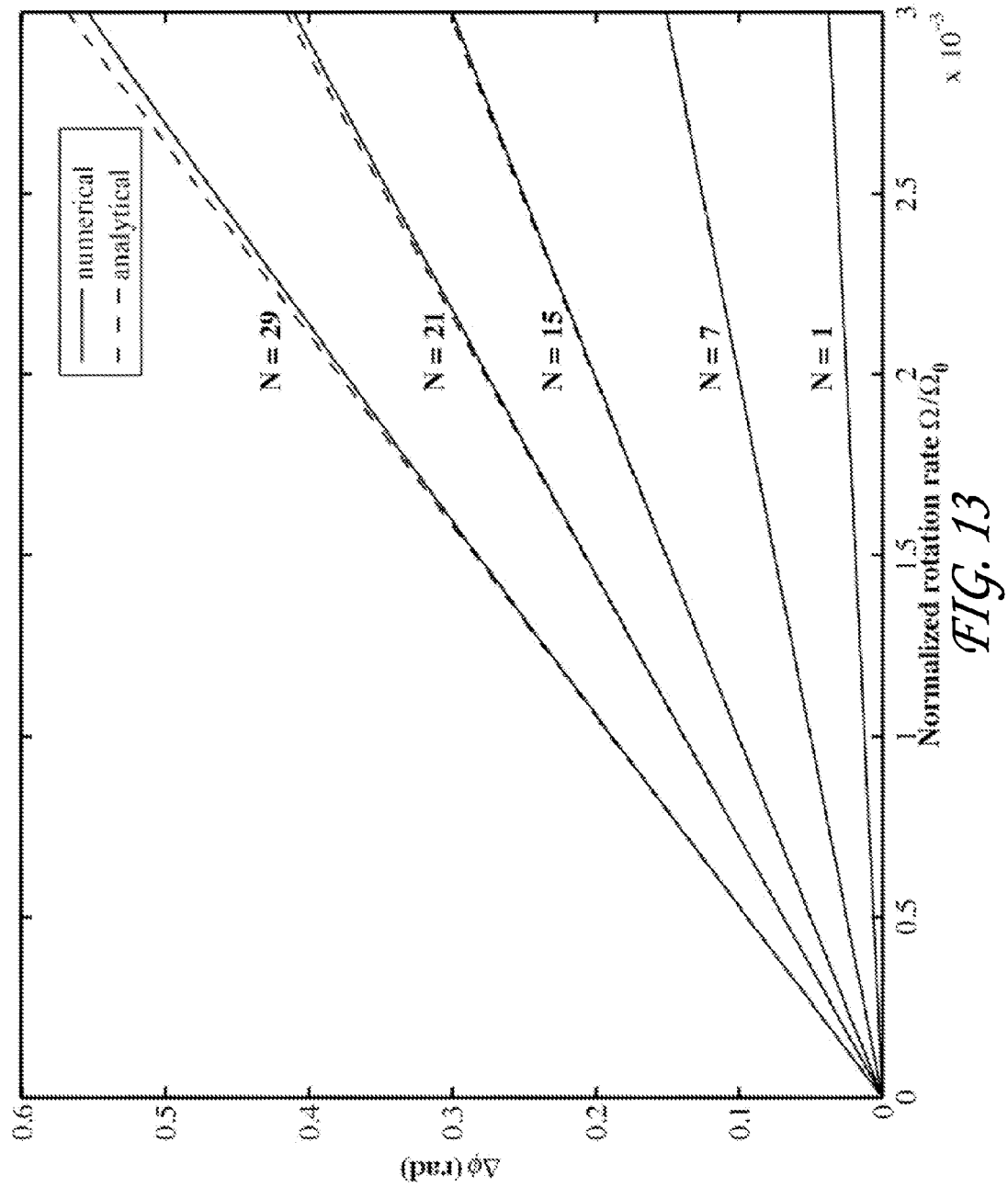
FIG. 13 plots a comparison of analytical (approximate) and numerical (exact) results for phase delay.

This expression in Eq. (3) is exact for N=1 and N=3. To confirm its expected validity for higher values of N (to first order in ∈), FIG. 13 plots the approximate phase shift predicted analytically by Eq. 3 versus the normalized rotation rate $\Omega/\Omega_0$ for N=1, 7, 15, 21 and 29 while keeping R, ω, and κ constant. For comparison, the exact Sagnac phase shift is plotted for the same values of N, calculated numerically using the first (exact) method. Note that for all practical small rotation rates, the ratio $\Omega/\Omega_0$ is extremely small, and the agreement between the two models is extremely good. For example, for reasonable CROW parameters (κ=0.001, λ=1.5 μm, and R=1 cm), $\Omega_0$=716 rad/s. For a rotation rate equal to Earth rate (conventional FOGs can routinely detect rotation rates three orders of magnitude smaller than Earth rate), $\Omega/\Omega_0 \approx 10^{-7}$. The maximum ratio $\Omega/\Omega_0$ plotted in FIG. 13 (0.003) therefore corresponds to an extremely large rotation rate (30,000 times Earth rate). FIG. 13 thus shows that even up to fairly high rotation rates, (the agreement improving for smaller rates), the agreement between the two models is exceedingly good, even for a large N. This agreement lends credence to the validity of this useful approximate analytical model.

A number of useful limiting cases can be investigated using Eq. 3. When κ=1, the bracket becomes equal to a geometrical form factor which, when multiplied by the $\pi R^2$ term in front of the bracket, yields the area B of the scalloped region traced by the signals through the coupled rings (see FIGS. 1A and 1B). Equation 3 then becomes:

$$\lim_{\kappa\to 1}\Delta\phi_{CROW} = \frac{4B\omega\Omega}{c^2}$$

(4)
which is exactly the expression of the Sagnac phase shift in a FOG of area B. It shows that in this limit of strong coupling, as described with physical arguments earlier on, the CROW gyroscope has the same sensitivity as a FOG of same area. This result could not be predicted from the expression provided by Scheuer et al. because only the term in 1/κ was retained there.

In the opposite limit of weak κ, for any value of N the second term in the bracket of Eq. 3 becomes negligible compared to the first term. The Sagnac phase shift then becomes:

$$\lim_{\kappa\to 0}\Delta\phi_{CROW}(N) = \frac{4\pi R^2 \omega \Omega}{c^2}\left(\frac{N+1}{2\kappa}\right) \quad (5)$$

The phase shift is now equal to that of a conventional FOG of area $(N+1)\pi R^2$, but enhanced by factor of 1(2κ). This term originates entirely from light resonating around each of the N rings. As expected, it is proportional to area $A=\pi R^2$ of each ring. The effect of the resonant structures is therefore to increase the Sagnac phase shift in inverse proportion to the coupling strength, as in an RFOG. It is interesting to note that the Sagnac phase shift depends on the number of rings as (N+1), instead of the expected N. This detail has no impact on the conclusions of this analysis (if only because of large N the difference becomes vanishingly small).

To summarize, these two limits and the form of Eq. 3 indicate that in the CROW gyroscope two contributions are present: a phase shift independent of κ that depends on the overall loop area B, as in a FOG, and a resonant phase shift proportional to 1/κ and to the area of each ring A, as in an RFOG. Another important conclusion from Eq. 3 is that in order to optimize a CROW gyroscope with a given footprint, since the resonant term in the Sagnac phase shift is proportional to the second power of R but only the first power of (N+1), the ring radius R, rather than the number of rings N, can be increased. Better gyroscopic performance is obtained when the phase difference $\Delta\phi(\Omega)$ is as large as possible for a given amount of loss. Since $\Delta\phi(\Omega)\propto R^2$ and $L_{eff}\propto R$, a large radius R is favored. Hence, for a given footprint a CROW gyroscope has an optimum sensitivity when R is as large as possible, which is when N=1. Thus, certain CROW gyroscope configurations have the same sensitivity and footprint as do a conventional resonant gyroscope.

The $(N+1)^2/\kappa^2$ dependence of the responsivity pointed out by Scheuer et al. arises strictly from the choice of phase bias (zero), a point not specifically mentioned in by Scheuer et al. In a conventional FOG with a zero phase bias, the detected power is proportional to $\cos^2(\Delta\phi/2)$. Since $\Delta\phi$ is proportional to $N_{FOG}$, the number of turns in the sensing coil the sensitivity scales like $N_{FOG}^2$. But it also scales like $\Omega^2$. Consequently, the zero-bias sensitivity exceeds the π/2-bias sensitivity only for large enough rotation rates, a property that has unfortunately little practical utility. On the other hand, for very slow rotations, which is what most high-accuracy applications utilize, $(N_{FOG}\Omega)^2 \ll N_{FOG}\Omega$, and the sensitivity is extremely poor. These simulations show that the same is true for the CROW gyroscope. To achieve maximum sensitivity, a non-zero bias point can be chosen.

In practice, a CROW gyroscope could be phase biased in much the same manner as a FOG, namely by placing a phase modulator asymmetrically in the gyroscope loop, for example at point M in FIGS. 1A and 1B. This modulator would then be driven at the proper frequency of the loop, related to the time it takes either signal to go around the loop once (a complex but quantifiable function of the coupling ratio κ). Studying the effect of such a dynamic biasing scheme on the sensitivity of the CROW gyroscope would require propagating the two time-dependent counter-propagating signals through the N coupled rings, which would be extremely time-consuming. As a simpler alternative, the interferometer can be biased by subjecting it to a fixed rotation rate $\Omega_b$. Although this approach is certainly not practical, it enables the transfer-matrix formalism to be used to quickly yet accurately study the effect of phase biasing on the sensitivity of a CROW gyroscope. In particular, it can provide information regarding which bias rotation rate $\Omega_b$ (and hence which phase bias $\phi_b$) maximizes the sensitivity to a perturbation $\delta\Omega$ in rotation rate. The gyroscope sensitivity is then given by $S=dP/d\Omega$, where P is the power measured by the detector (port A in FIGS. 1A and 1B).

Since this analysis is concerned primarily with comparing the performance of a CROW gyroscope to that of a conventional FOG, it should not unduly put the CROW at either an advantage or disadvantage. The three independent design parameters that affect the sensitivity of both types of gyroscopes are (1) the length of waveguide (fiber or otherwise), (2) the waveguide loss per unit length, and (3) the diameter of the sensing loop (which by and large dictates the footprint of the packaged gyroscope). It would be unfair, for example, to compare a FOG with a 200-m loop coiled in a 10-cm diameter spool to a CROW gyroscope utilizing 1000 m of fiber spread on a loop of 10-m diameter, as the CROW would then have a much greater scale factor, and hence sensitivity.

So for fair comparison, the following analysis applies the following four conditions to the two types of gyroscopes. First, the same optical power $P_0$ is assumed to be incident on the two gyroscopes (port A in FIGS. 1A and 1B). Second, the waveguides forming the rings are assumed to have the same low loss as the typical conventional single-mode fiber in a gyroscope (~0.2 dB/km at 1550 nm). (FOGs typically use a polarization-maintaining fiber, which has a higher loss, but the exact value of the loss has no bearing on the result of the comparison.)

Third, their respective effective lengths are imposed to be equal to guarantee that signals suffer the same propagation loss when going around the sensing loop. In a conventional FOG, after propagating through $N_{FOG}$ turns of radius $R_{FOG}$ each signal is attenuated by a factor $\exp(-\alpha L_{FOG})$, where $L_{FOG}=2\pi N_{FOG}R_{FOG}$ is the total sensing loop length and $\alpha$ is the fiber loss. In a CROW gyroscope, after propagating through N rings of radius R, the signal is attenuated by a factor $\exp(-\alpha L_{CROW})$, where $L_{CROW}$ is approximately equal to N times the length of one ring ($2\pi R$) multiplied by the number of times the signal goes around each loop ($\sim 1/(2\kappa)$), i.e., $L_{CROW} \approx N\pi R/\kappa$). The requirement for equal gyroscope losses therefore imposes $L_{CROW}=L_{FOG}$, i.e.:

$$N_{FOG}R_{FOG} = \frac{NR}{2\kappa} \tag{6a}$$

However, this approximate expression for $L_{CROW}$ is accurate enough only for certain ranges of parameters (specifically, when N is large and $\kappa$ is not too weak). To keep the comparison between the two gyroscopes as accurate as possible, instead of using this expression, $L_{CROW}$ is computed directly by calculating numerically the amount of power $P_A$ exiting port A in the non-rotating gyroscope. $L_{CROW}$ is then defined by $\exp(-\alpha L_{CROW})=P_A/P_0$, where $P_0$ is the power incident on the first loop. Imposing $L_{CROW}=L_{FOG}$ then yielded a condition on $N_{FOG}$ and $R_{FOG}$ slightly different (and more accurate) than Eq. 6(a).

The fourth condition is that two gyroscopes are compared with similar footprints. Reference to FIGS. 1A and 1B shows that when N is reasonably large (more than a few rings), the footprint of a CROW gyroscope in which the rings are arranged approximately along a circle is mostly empty. Since in such a gyroscope the resonant component of the phase sensitivity is independent of the path followed by the rings, one can reduce the footprint of a CROW gyroscope without significantly affecting its sensitivity by arranging the rings along a different path that better utilizes this empty space.

Figure 14B:
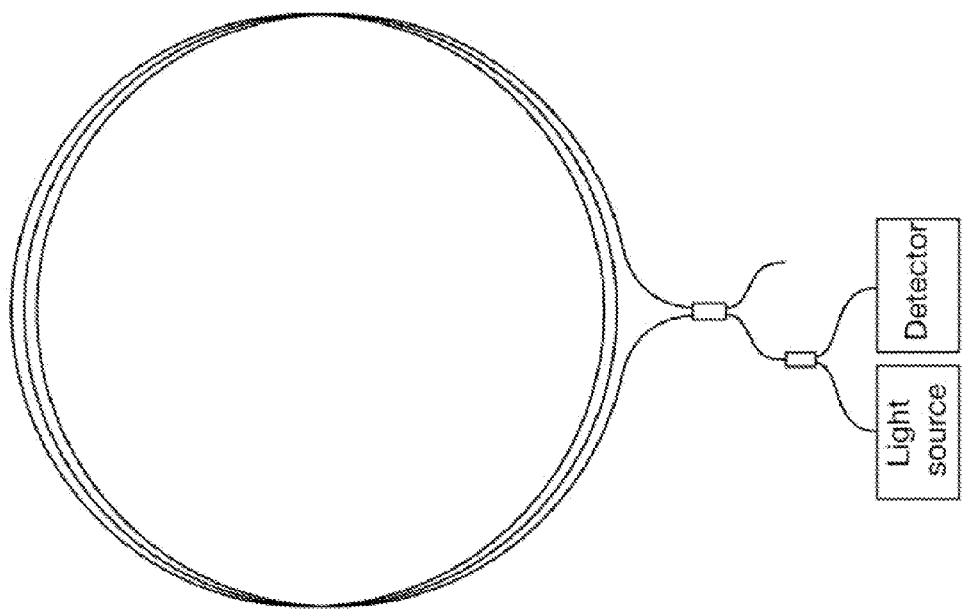
FIG. 14B schematically illustrates a FOG having a plurality of stacked rings over one another with an equivalent footprint as the CROW gyroscope of FIG. 12A (dots indicate couplers).
Figure 14A:
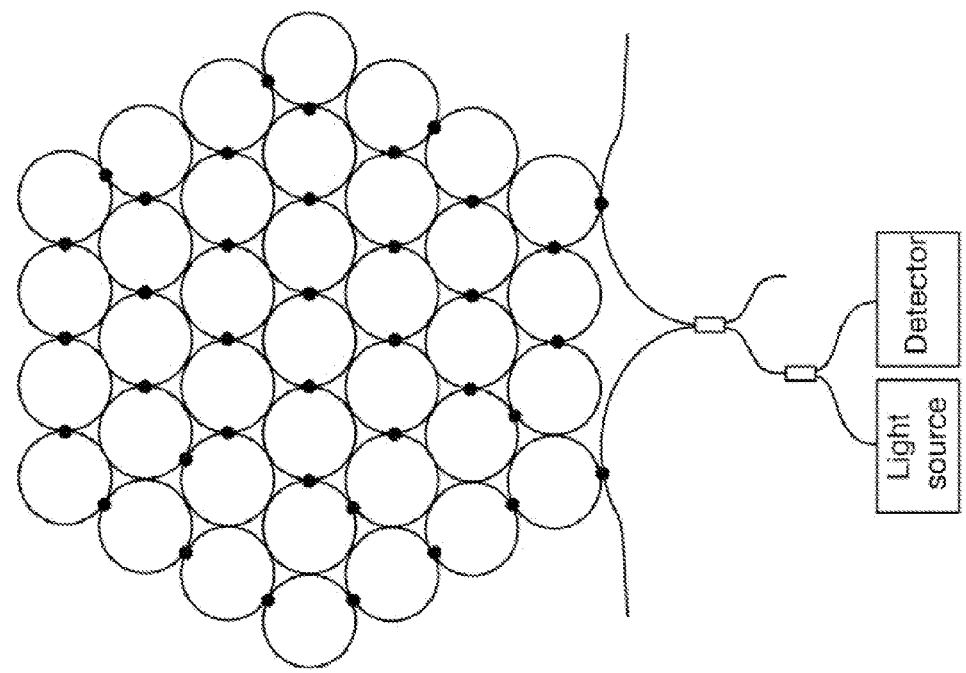
FIG. 14A schematically illustrates a CROW gyroscope having a plurality of tightly-packed rings (dots show coupling points between the rings).

For example, the string of rings can be coiled in a spiral (as schematically illustrated by FIG. 14A) or the rings can be stacked over one another (as schematically illustrated by FIG. 5A). As a result, either more rings can be packed in a circle of given radius, or a given number of rings will occupy a smaller footprint. In certain embodiments, a CROW gyroscope can be made shorter than a conventional FOG of the same scale factor, but no shorter than a resonant gyroscope. Note that in doing so, the non-resonant component of the CROW's phase sensitivity (second term in Eq. 3) is greatly reduced. However, for any reasonably large value of N this component is negligible compared to the resonant component, so neglecting it does not unduly disfavor the CROW gyroscope.

For simplicity, to calculate the total area of a "coiled" CROW gyroscope of the type shown in FIG. 14A, this area is assumed to be simply equal to the sum of the area of the N rings, i.e., $N_{CROW} \pi R_{CROW}^2$. This approximation ignores the area of the interstitial regions between the rings, which artificially reduces the CROW gyroscope footprint and hence again favors the CROW gyroscope over the FOG. Note that this approximation is valid not just for a spiral, but for any path that fills the CROW gyroscope footprint fairly well.

Imposing equal footprint for this "coiled" CROW gyroscope and for the conventional FOG to which it is compared (see FIG. 14B) then yields the fourth condition:

$$N_{CROW}\pi R_{CROW}^2 = \pi R_{FOG}^2 \tag{6b}$$

In general, the Sagnac phase shift is proportional to the area around which light has traveled. For the conventional FOG, this phase shift is determined completely by the fiber loss as well as the device footprint. For a CROW gyroscope, the maximum distance that light can travel is still limited by the fiber loss. Thus, for a same device footprint, the maximal phase shift that a CROW gyroscope can have should be similar to the corresponding conventional FOG. Intuitively therefore, one should not expect an enhancement of absolute sensitivity in the CROW gyroscope system.

Based on the foregoing, the responsivity S versus phase bias of a few CROW gyroscopes was simulated numerically using the transfer matrix formalism. These gyroscopes all have the same coupling ratio ($\kappa=0.001$), ring radius (R=5 cm), and loss coefficient (0.2 dB/km) but different numbers of rings N. For each of these CROW gyroscopes, this calculated sensitivity is compared to that of the "equivalent" FOG, namely the FOG with a sensing coil of $N_{FOG}$ turns and radius $R_{FOG}$ calculated from $\kappa$, N, and R by imposing $L_{CROW}=L_{FOG}$ and using Eq. 6(b).

In the CROW gyro, as in a simple ring resonator, there exists a critical coupling value $\kappa_{crit}$ which maximizes the power circulating in the individual rings. However, unlike in a simple ring resonator, the critical coupling value is not simply given by the single-pass resonator loss. Our simulations show that (1) the sensitivity of the CROW gyroscope is maximum for a $\kappa$ value greater than $\kappa_{crit}$, and (2), no value of $\kappa$ makes the CROW gyroscope more sensitive than the equivalent FOG. Hence, for simplicity and without loss of generality, in the following we investigate only the case of coupling greater than critical coupling.

The CROW gyroscope suffers from a power-loss mechanism not present in a conventional FOG, namely when its sensing loop is rotated, some of the power exits the loop at ports C and D (see FIGS. 1A and 1B). This is because the individual rings are on resonance when the loop is stationary. Under rotation, the rings are no longer on resonance, and these two ports transmit some (and equal) amount of power.

Figure 15:
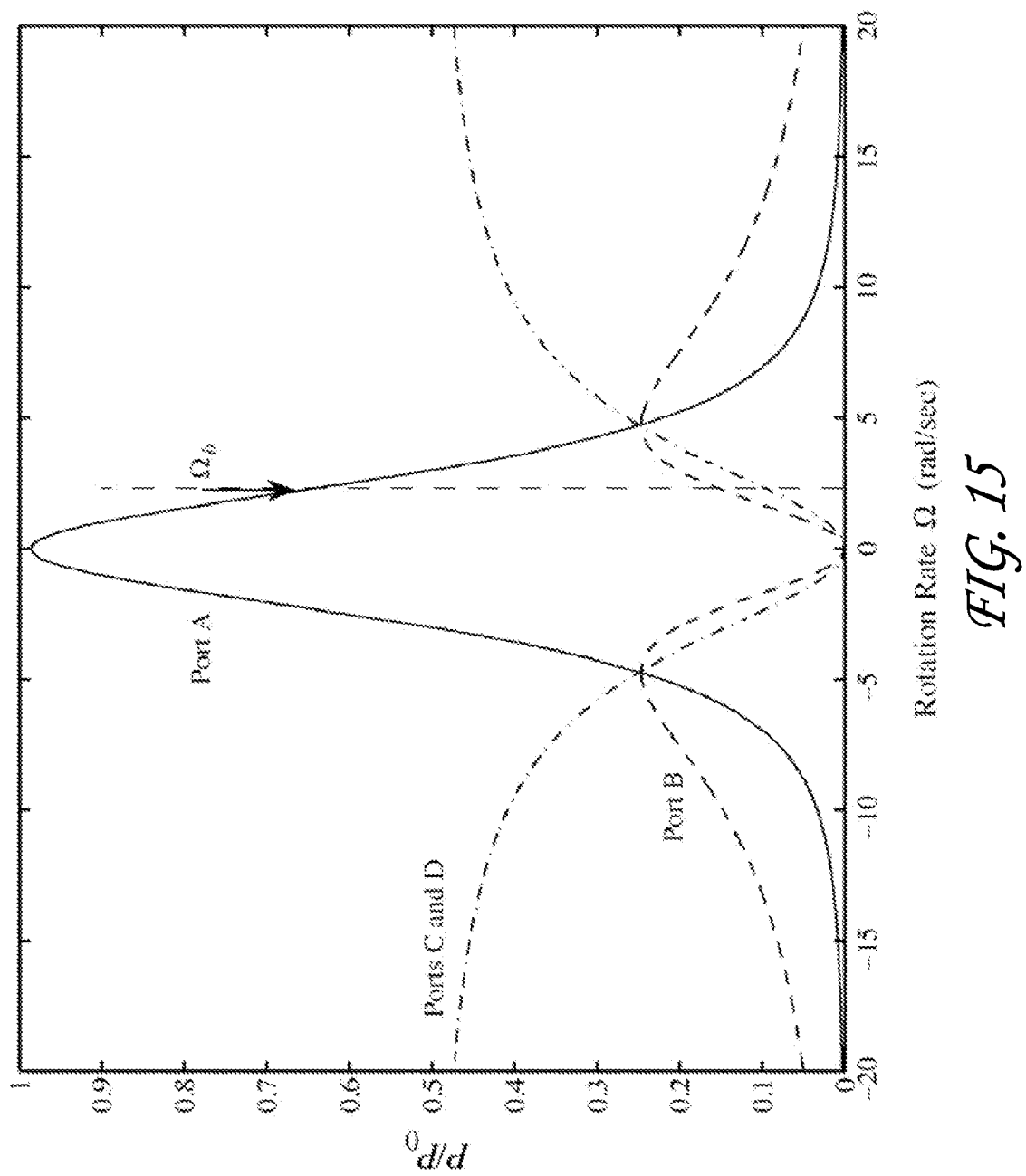
FIG. 15 plots the evolution of output power in the four arms of a CROW gyroscope with N=1 rings.

To illustrate this point, FIG. 15 plots the power exiting each port, normalized to the input power $P_0$, as a function of rotation rate for a CROW with the parameters cited above and N=1. At $\Omega=0$, the rings are probed on resonance and no power exits from ports C and D. Also, as in a classical FOG, all the power returns into port A, and none in the nonreciprocal port (port B). As $\Omega$ is increased, the power in port A decreases while the power in port B increases, as in a conventional fiber gyroscope. However, as the cw and ccw signals both slip increasingly off resonance, some of the power exits at ports C and D. This power leakage increases with $\Omega$, until it is strong enough that the power in the non-reciprocal port B eventually decreases (see FIG. 15). At large enough rotation rates, the power in port C (and D) reaches a plateau. For some extremely large $\Omega$, well beyond the range of values covered by FIG. 15, the next resonance frequency of the loop approaches the light frequency, and the same process takes place again, in reverse power drains back out of ports C and D, until at this new resonance all the power is in port A. FIG. 15 shows that at some rotation rate, identified as $\Omega_b$ in FIG. 15, the dependence of the power in port A on $\Omega$, and hence the sensitivity of the CROW gyro, is maximum. This confirms the existence of a phase bias that maximizes the response of a CROW gyroscope.

Figure 16A:
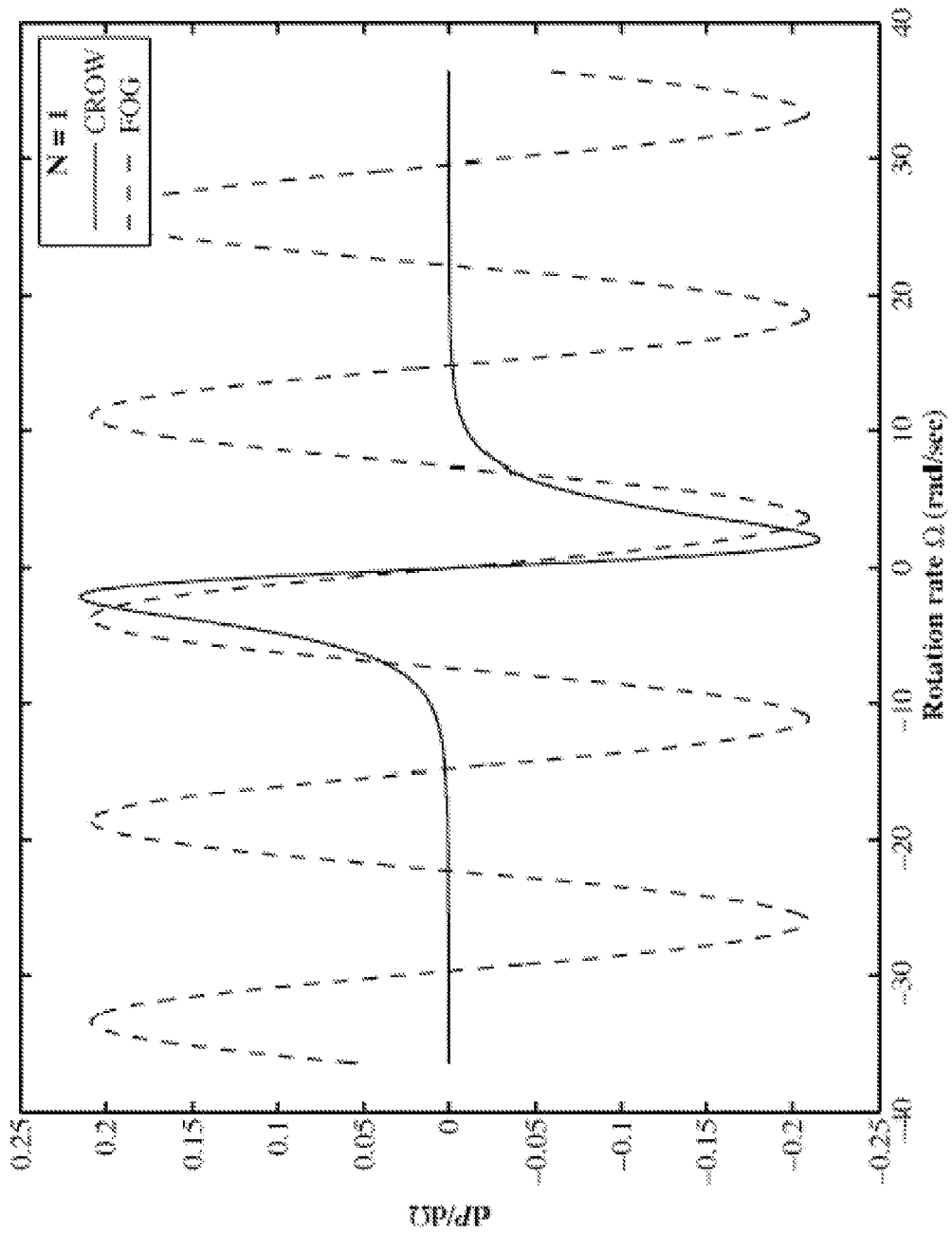
FIGS. 16A-16C plot the sensitivity of CROW gyroscopes and equivalent FOGs as a function of rotation rate for N=1, 9, 81, respectively.

FIG. 16A shows the sensitivity computed for the same CROW gyroscope with N=1, as well as the sensitivity of the equivalent conventional FOG, again interrogated with the same incident power. As expected from the foregoing discussion, the CROW sensitivity is maximum at $\Omega_b$ and it decreases on either side of this optimum value. The phase bias corresponding to this bias rotation rate is $\phi_b \approx 0.84$ rad. This value depends weakly on the strength of the coupling between rings. As $\kappa$ is reduced from the value used in this example ($\kappa$=0.001), the resonances narrow and hence $\Omega_b$ decreases. However, light also travels more times around each ring, so the actual differential phase shift due to $\Omega_b$ increases. Simulations shows that these two dependences cancel each other, as expected, so the optimum phase bias $\phi_b$ resulting from this $\Omega_b$ is essentially independent of coupling strength. It also depends weakly on the number of rings and on the ring radius. FIG. 16A also shows that when the CROW gyroscope is operated at its optimum bias ($\Omega_b \approx 2.1$ rad/s) its sensitivity is essentially the same (within 3%) as that of the equivalent FOG. The small difference in sensitivity is due to the different shapes of the transmission functions for the CROW and FOG, and it cannot be significantly enhanced by changing the CROW parameters.

Figure 16B:
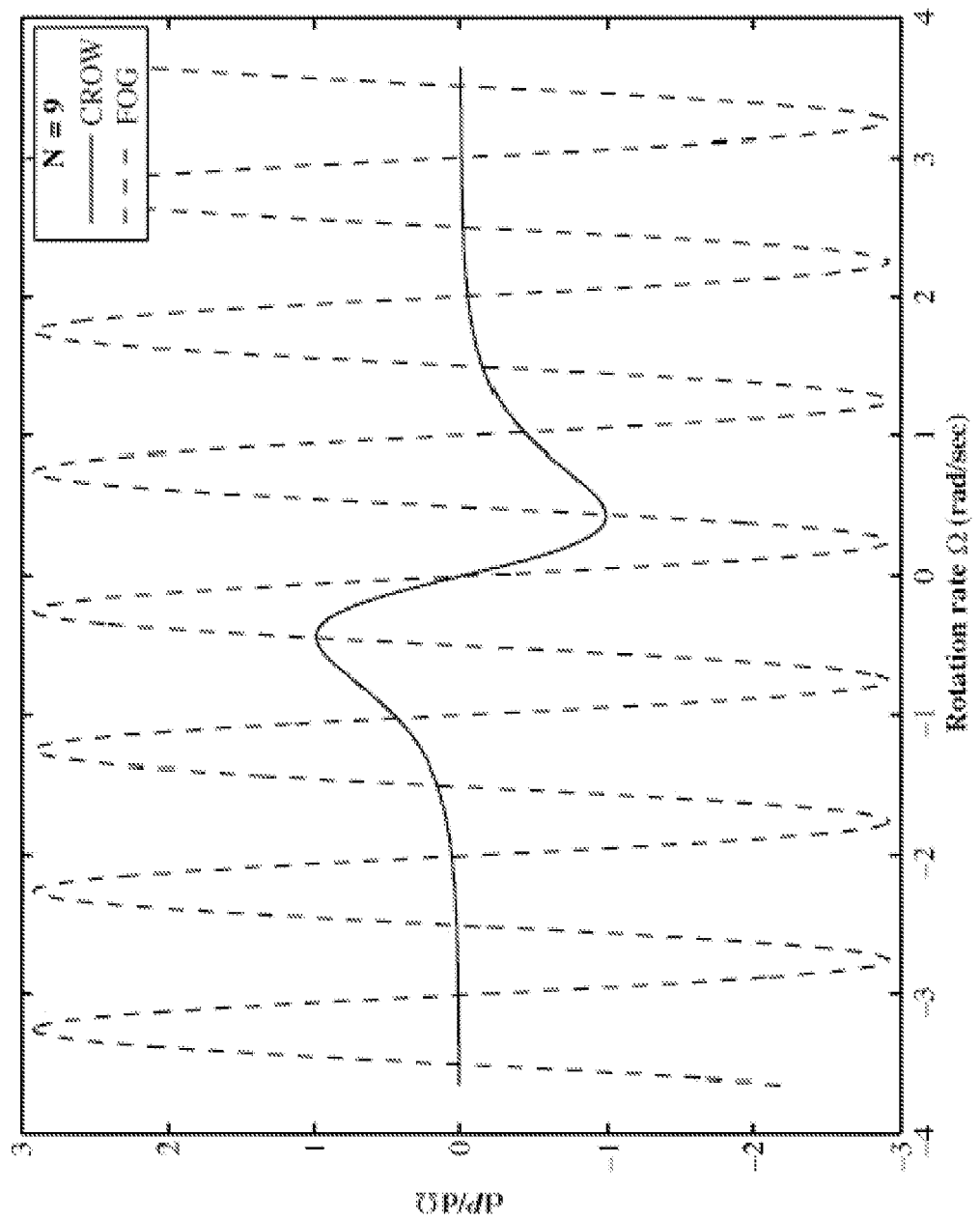
Figure 16C:
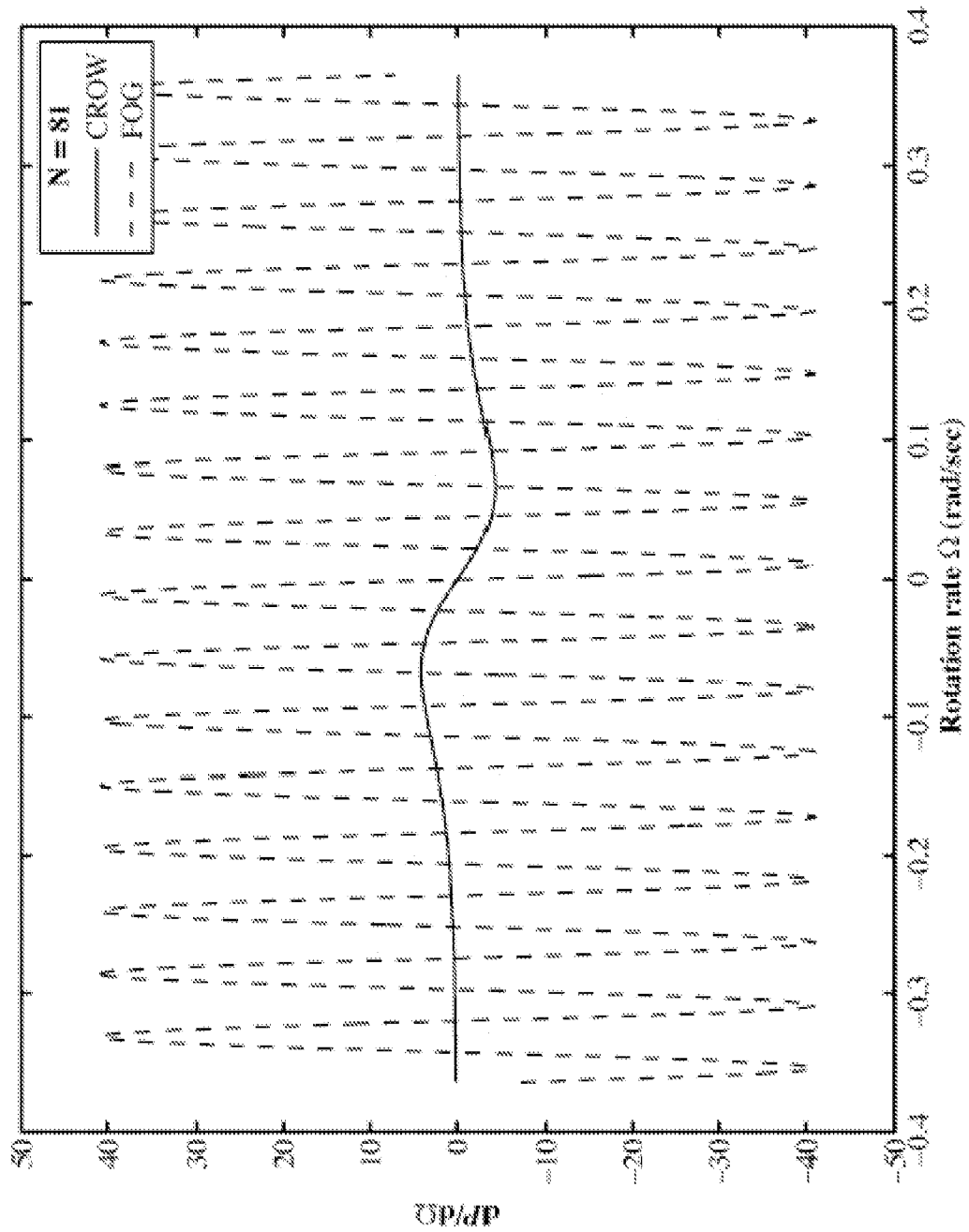

FIGS. 16B and 16C show the same curves for N=9 and N=81, respectively. As N increases, the maximum sensitivity of the equivalent FOG gyroscope increases. The reason is that the product $R_{FOG} N_{FOG}$ increases with N (see Eq. 6a), hence the scale factor of the equivalent FOG, which relates the Sagnac phase shift (or S) to $\Omega$ and which is proportional to $R_{FOG}^2 N_{FOG}$, increases. The sensitivity of the CROW gyroscope also increases with N, but it does so more slowly than the FOG, so the sensitivity of the CROW gyroscope relative to the FOG decreases. This is consistent with the prediction that the sensitivity of the CROW gyroscope compares most favorably to that of the equivalent FOG for N=1. Simulations show that this ratio of sensitivities is approximately constant for $\kappa$ between $\sim 10^{-4}$ and $\sim 10^{-1}$. For $\kappa < 10^{-4}$ or $\kappa > 0.1$, this ratio decreases. As stated above, the ratio of maximum sensitivities cannot be significantly enhanced by changing $\kappa$.

It is interesting to note that the dependence of the ratio of FOG to CROW sensitivity can be predicted from basic principles, using Eq. 3. In general, the maximum sensitivity of a gyroscope is proportional to the effective area it covers. For a FOG, this is simply $N_{FOG} \pi R_{FOG}^2$. From Eq. 3, the effective area covered by the CROW rings is approximately $N_{CROW} \pi R_{CROW}^2 / (2\kappa)$ for large values of N. The first term in Eq. 3 can be ignored since it is the nonresonant term that depends on the overall path traced by the CROW. Using these definitions of effective area, as well as Eq. 6, it is trivial to show that for the same loss, the equivalent FOG has an effective area (and hence a maximum sensitivity) $N^{1/2}{}_{CROW}$ times greater than the CROW. FIG. 16A-16C shows that this approximate expression works quite well. Intuitively, the FOG is more sensitive than the equivalent CROW because a signal traveling along a large loop (as in the FOG) accumulates more rotation-induced phase per unit length than a signal traveling along a small loop (as in the CROW).

These conclusions were drawn for a particular example, but they are independent of the choice of parameter values. The overall conclusion is that the CROW gyroscope offers no significant enhancement in small-rotation sensitivity compared to a conventional FOG.

The above analysis suggests that although the light travels through a CROW gyroscope with an apparent group velocity that is lower than in a non-resonant waveguide, slow light plays no role in the enhanced response of a CROW gyroscope. To illustrate this important point, consider the behavior of the CROW gyroscope shown in FIGS. 1A and 1B when the radius of each ring approaches zero while keeping the overall area B covered by the loop of rings constant. In this case, the number of rings increases indefinitely, the total area covered by the individual ring resonators goes to zero, and the sensing loop converges to a circle of constant area B. It is then easy to show from Eq. 3 (and confirm with exact simulations) that the differential phase shift approaches $4B\omega\Omega/c^2$, which is precisely the differential phase shift of a FOG of area B. Yet in this CROW, the apparent group velocity of the light is much slower than in this FOG, in which light travels with a "normal" group velocity. Specifically, it is easy to show that this group velocity is roughly $c\kappa/(\pi n)$, independently of N. The two gyroscopes have very different apparent group velocity yet the same phase sensitivity to rotation.

Figure 17:
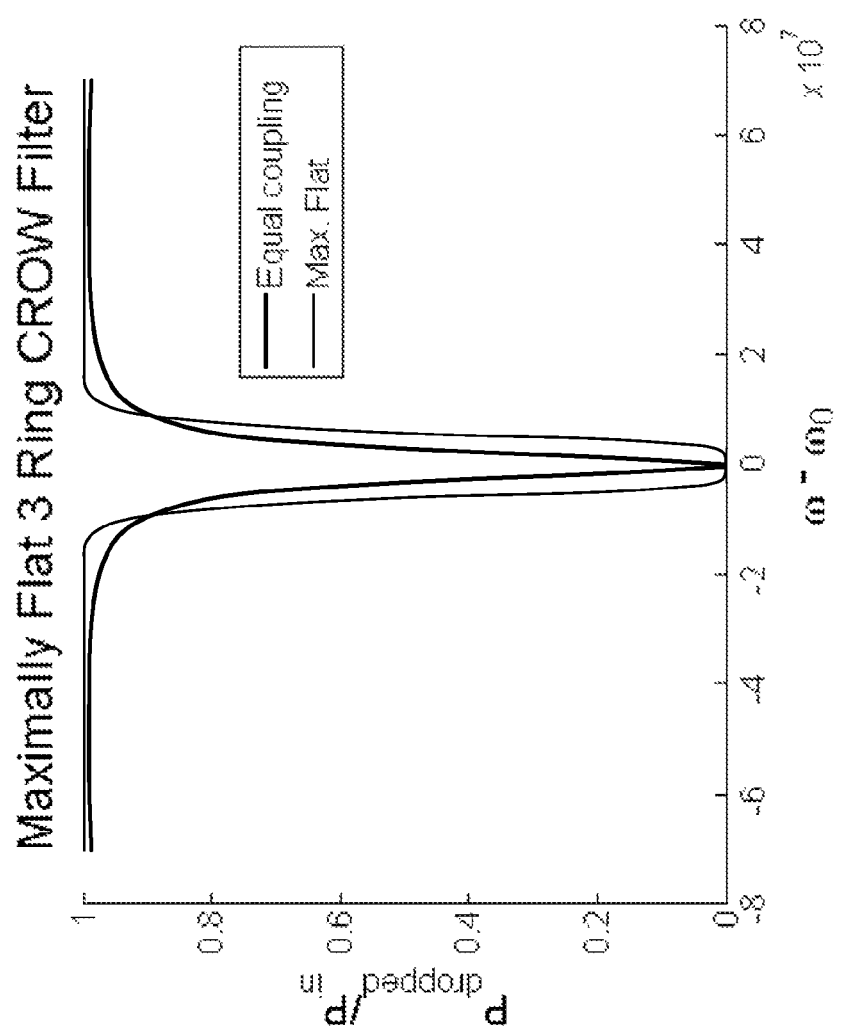
FIG. 17 plots the response of a maximally flat 3-ring CROW filter.

In certain embodiments, the CROW configuration can be used as a filter. FIG. 17 plots the response of a maximally flat 3-ring CROW filter. By suitably choosing the coupling coefficients, the CROW structure of certain embodiments can be made into flat filters with steep sides.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. An optical waveguide gyroscope comprising a plurality of resonant waveguides adjacent to one another and optically coupled together, wherein each resonant waveguide of the plurality of resonant waveguides is configured to allow light to propagate along the resonant waveguide in a planar path, wherein the plurality of resonant waveguides comprises at least two resonant waveguides comprising a first resonant waveguide configured to allow light to propagate along the first resonant waveguide in a first path and a second resonant waveguide adjacent to the first resonant waveguide and configured to allow light to propagate along the second resonant waveguide in a second path, wherein the first resonant waveguide and the second resonant waveguide are optically coupled in a way that at least a portion of light propagates either successively through the first resonant waveguide along the first path in a clockwise direction and through the second resonant waveguide along the second path in a clockwise direction or successively through the first resonant waveguide along the first path in a counterclockwise direction and through the second resonant waveguide along the second path in a counterclockwise direction.

2. The optical waveguide gyroscope of claim 1, wherein at least one of the resonant waveguides comprises at least one ring waveguide.

3. The optical waveguide gyroscope of claim 1, wherein at least one of the resonant waveguides comprises at least one microresonator.

4. The optical waveguide gyroscope of claim 1, wherein the resonant waveguides are positioned such that the planar paths of the plurality of resonant waveguides are in a common plane.

5. The optical waveguide gyroscope of claim 4, wherein the resonant waveguides are positioned along a straight line.

6. The optical waveguide gyroscope of claim 4, wherein the resonant waveguides are positioned along a curved line.

7. The optical waveguide gyroscope of claim 1, wherein each planar path has a normal direction perpendicular to the path, and the resonant waveguides are positioned such that the normal directions of the paths are coincident with one another.

8. The optical waveguide gyroscope of claim 1, wherein at least one of the resonant waveguides includes a twisted portion optically coupled to an adjacent resonant waveguide.

9. The optical waveguide gyroscope of claim 1, wherein at least one of the resonant waveguides is optically coupled to an adjacent resonant waveguide by a ring waveguide having an area smaller than an area of the at least one of the resonant waveguides.

10. The optical waveguide gyroscope of claim 1, wherein a coupling ratio between adjacent resonant waveguides of the plurality of resonant waveguides is less than one.

11. An optical waveguide gyroscope comprising:
at least one optical coupler having a first port, a second port, and a third port, the at least one optical coupler configured to receive a first optical signal at the first port, to transmit a second optical signal to the second port, and to transmit a third optical signal to the third port; and
a plurality of resonant waveguides optically coupled to the second port and the third port, the resonant waveguides adjacent to one another and optically coupled to one another, wherein at least a portion of the second optical signal propagates from the second port to the third port by propagating through the plurality of resonant waveguides, and at least a portion of the third optical signal propagates from the third port to the second port by propagating through the plurality of resonant waveguides, wherein the plurality of resonant waveguides comprises at least two resonant waveguides comprising a first resonant waveguide configured to allow at least a portion of the second optical signal to propagate along the first resonant waveguide in a first path and a second resonant waveguide adjacent to the first resonant waveguide and configured to allow the at least a portion of the second optical signal to propagate along the second resonant waveguide in a second path, wherein the first resonant waveguide and the second resonant waveguide are optically coupled in a way that the at least a portion of the second optical signal propagates either successively through the first resonant waveguide along the first path in a clockwise direction and through the second resonant waveguide along the second path in a clockwise direction or successively through the first resonant waveguide along the first path in a counterclockwise direction and through the second resonant waveguide along the second path in a counterclockwise direction.

12. The optical waveguide gyroscope of claim 11, wherein the first resonant waveguide is configured to allow at least a portion of the third optical signal to propagate along the first resonant waveguide in a third path and the second resonant waveguide is configured to allow the at least a portion of the third optical signal to propagate along the second resonant waveguide in a fourth path, wherein the first resonant waveguide and the second resonant waveguide are optically coupled in a way that the at least a portion of the third optical signal propagates either successively through the second resonant waveguide along the fourth path in a clockwise direction and through the first resonant waveguide along the third path in a clockwise direction or successively through the second resonant waveguide along the fourth path in a counterclockwise direction and through the first resonant waveguide along the third path in a counterclockwise direction.

13. The optical waveguide gyroscope of claim 11, further comprising a plurality of optical couplers, each optical coupler between and optically coupling two adjacent resonant waveguides of the plurality of resonant waveguides to one another.

14. The optical waveguide gyroscope of claim 13, wherein at least one optical coupler of the plurality of optical couplers comprises a ring resonator optically coupled to a first resonant waveguide of the plurality of resonant waveguides and to a second resonant waveguide of the plurality of resonant waveguides.

15. The optical waveguide gyroscope of claim 14, wherein the first resonant waveguide is planar and surrounds a first area, the second resonant waveguide is planar and surrounds a second area, and the ring resonator is planar and surrounds a third area, the third area smaller than the first area and smaller than the second area.

16. The optical waveguide gyroscope of claim 15, wherein the third area is less than 10% of the first area and less than 10% of the second area.

17. The optical waveguide gyroscope of claim 11, further comprising a plurality of optically coupling portions, each optically coupling portion optically coupling two adjacent resonant waveguides of the plurality of resonant waveguides to one another, wherein at least one optical coupling portion of the plurality of optically coupling portions comprises a first portion of a first resonant waveguide of the plurality of resonant waveguides, the first portion adjacent to a second resonant waveguide of the plurality of waveguides and optically coupled to the second resonant waveguide, wherein the first portion comprising two sections of the first resonant waveguide that cross over one another.

18. The optical waveguide gyroscope of claim 17, wherein the coupling portion comprises a 180 degree twist of the first resonant waveguide, the first resonant waveguide is planar and surrounds a first area, the coupling portion is planar and surrounds a second area less than 10% of the first area.

19. The optical waveguide gyroscope of claim 11, wherein the at least a portion of the second optical signal and the at least a portion of the third optical signal are combined by the optical coupler and transmitted to the first port.

20. The optical waveguide gyroscope of claim 11, wherein each of the at least two resonant waveguides is planar, and the at least two resonant waveguides are parallel to one another.

21. The optical waveguide gyroscope of claim 20, wherein the at least two resonant waveguides are planar with one another.

22. The optical waveguide gyroscope of claim 21, wherein the at least two resonant waveguides are positioned along a straight line.

23. The optical waveguide gyroscope of claim 21, wherein the at least two resonant waveguides are positioned along a curved line.

24. The optical waveguide gyroscope of claim 20, wherein each of the at least two resonant waveguides defines a normal direction perpendicular to the resonant waveguide, and the at least two resonant waveguides are positioned such that the normal directions are coincident with one another.

25. The optical waveguide gyroscope of claim 20, wherein the at least two resonant waveguides are stacked above one another.

26. An optical waveguide gyroscope comprising a plurality of resonant waveguides adjacent to one another and optically coupled together, wherein each resonant waveguide of the plurality of resonant waveguides is configured to allow light to propagate through the resonant waveguide in a planar path, wherein the paths of each of the resonant waveguides of the plurality of resonant waveguides are parallel to one another, wherein at least one of the resonant waveguides includes a twisted portion optically coupled to an adjacent resonant waveguide, wherein light propagates along each path in a clockwise direction or along each path in a counterclockwise direction.

* * * * *

UNITED STATES PATENT AND TRADEMARK OFFICE
CERTIFICATE OF CORRECTION

PATENT NO. : 8,068,232 B2  
APPLICATION NO. : 12/416767  
DATED : November 29, 2011  
INVENTOR(S) : Terrel et al.

Page 1 of 1

It is certified that error appears in the above-identified patent and that said Letters Patent is hereby corrected as shown below:

Title Page 2, Column 1, under OTHER PUBLICATIONS, Line 64, change "Optics" to --Optical--.

At Column 5, Line 23, change "(RFOC)" to --(RFOG)--.

At Column 5, Line 64, change "(sees" to --(see,--.

At Column 6, Line 24, change "gyroscopes" to --gyroscope's--.

At Column 15, Line 61, change "$M_{co}$," to --$M_{co}$--.

At Column 16, Line 15, change " $K$ " to -- $K_3$ --.

At Column 16, Line 61, change " $(\Omega<\Omega_0)/(N+1),$ " to -- $(\Omega << \Omega_0/(N+1),$ --.

At Column 17, Line 31, change " $(30,000$ " to -- $(30,000$ --.

At Column 18, Line 1, change " $A=7\pi R^2$ " to -- $A = \pi R^2$ --.

At Column 18, Line 32, change "coil" to --coil,--.

At Column 21, Line 8, change "reverse" to --reverse:--.

Signed and Sealed this  
Sixth Day of November, 2012

David J. Kappos  
*Director of the United States Patent and Trademark Office*